United States Patent
Okada

(10) Patent No.: US 10,126,997 B2
(45) Date of Patent: Nov. 13, 2018

(54) IMAGE PROCESSING SYSTEM, IMAGE FORMING APPARATUS, METHOD FOR SHARING DATA, AND NON-TRANSITORY RECORDING MEDIUM FOR STORING COMPUTER READABLE PROGRAM

(71) Applicant: KONICA MINOLTA, INC., Chiyoda-ku, Tokyo (JP)

(72) Inventor: Tatsunori Okada, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/630,640

(22) Filed: Jun. 22, 2017

(65) Prior Publication Data
US 2017/0371607 A1 Dec. 28, 2017

(30) Foreign Application Priority Data
Jun. 24, 2016 (JP) .................................. 2016-125070

(51) Int. Cl.
*G03G 15/00* (2006.01)
*G06F 3/12* (2006.01)
*H04N 1/00* (2006.01)
*H04N 1/23* (2006.01)

(52) U.S. Cl.
CPC .......... *G06F 3/1291* (2013.01); *G06F 3/1203* (2013.01); *G06F 3/126* (2013.01); *G06F 3/1232* (2013.01); *H04N 1/00344* (2013.01); *H04N 1/2315* (2013.01); *H04N 2201/0039* (2013.01); *H04N 2201/0094* (2013.01)

(58) Field of Classification Search
CPC ...... G06F 3/1203; G06F 3/1232; G06F 3/126; G06F 3/1291; H04N 1/00344; H04N 1/2315; H04N 2201/0039; H04N 2201/0094
See application file for complete search history.

(56) References Cited

U.S. PATENT DOCUMENTS 8,896,864 B2 * 11/2014 Haba ...................... G06F 3/1206
358/1.15

FOREIGN PATENT DOCUMENTS

JP 2012-186560 A 9/2012
JP 2015-177522 A 10/2015

* cited by examiner

*Primary Examiner* — Hoang Ngo
(74) *Attorney, Agent, or Firm* — Buchanan Ingersoll & Rooney PC

(57) ABSTRACT

An image forming apparatus is provided which is used in a system having a first group and one or more second groups into which a plurality of second image forming apparatuses are classified, and classified into the first group together with a third image forming apparatus. The image forming apparatus includes a transmitter configured to send target data to be shared to the plurality of second image forming apparatuses, one by one, classified into the second groups, and to send the target data to the third image forming apparatus.

18 Claims, 19 Drawing Sheets

| DEVICE NAME | GROUP CODE | IP ADDRESS | TYPE | ... | |
|---|---|---|---|---|---|
| M011 | G01 | 192.168.1.101 | GM,ST | ... | ~6A |
| M012 | G01 | 192.168.1.102 | ST | ... | ~6A |
| M013 | G01 | 192.168.1.103 | ST | ... | ~6A |
| : | : | : | : | : | |
| M017 | G01 | 192.168.1.107 | CL | ... | ~6A |
| M018 | G01 | 192.168.1.108 | CL | ... | ~6A |
| : | : | : | : | : | |
| M021 | G02 | 192.168.2.101 | GM,CL | ... | ~6A |
| M022 | G02 | 192.168.2.102 | ST | ... | ~6A |
| M023 | G02 | 192.168.2.103 | ST | ... | ~6A |
| : | : | : | : | : | |
| M026 | G02 | 192.168.2.106 | CL | ... | ~6A |
| M027 | G02 | 192.168.2.107 | CL | ... | ~6A |
| : | : | : | : | : | |
| M031 | G03 | 192.168.3.101 | GM,ST | ... | ~6A |
| M032 | G03 | 192.168.3.102 | ST | ... | ~6A |
| M033 | G03 | 192.168.3.103 | ST | ... | ~6A |
| : | : | : | : | : | |
| M037 | G03 | 192.168.3.107 | CL | ... | ~6A |
| M038 | G03 | 192.168.3.107 | CL | ... | ~6A |
| : | : | : | : | : | |
| M041 | G04 | 192.168.4.101 | GM,ST | ... | ~6A |
| M042 | G04 | 192.168.4.102 | ST | ... | ~6A |
| M043 | G04 | 192.168.4.103 | ST | ... | ~6A |
| : | : | : | : | : | |
| M046 | G04 | 192.168.4.106 | CL | ... | ~6A |
| M047 | G04 | 192.168.4.107 | CL | ... | ~6A |
| : | : | : | : | : | |

| DEVICE NAME | IP ADDRESS | TYPE | ... |
|---|---|---|---|
| M011 | 192.168.1.101 | GM,ST | ... |
| M012 | 192.168.1.102 | ST | ... |
| M013 | 192.168.1.103 | ST | ... |
| M014 | 192.168.1.104 | ST | ... |
| M015 | 192.168.1.105 | CL | ... |
| M016 | 192.168.1.106 | CL | ... |
| M017 | 192.168.1.107 | CL | ... |
| M018 | 192.168.1.108 | CL | ... |
| M019 | 192.168.1.109 | CL | ... |
| M020 | 192.168.1.110 | CL | ... |

FIG. 12A

| DOCUMENT NAME | REGISTERED TIME | NUMBER OF SETS | COLOR | DOUBLE-SIDED |
|---|---|---|---|---|
| ABB | 2016/06/02 14:16 | 1 | ■ | |
| ABCE | 2016/06/02 14:18 | 3 | ▨ | |
| CCD1 | 2016/06/02 14:22 | 4 | ■ | |
| CCD2 | 2016/06/02 14:24 | 2 | ■ | |
| BBCC | 2016/06/02 14:33 | 1 | ▨ | |

GROUP A / OTHER GROUPS

UPDATE LIST / CHECK STATUS

SELECT ALL / CANCEL ALL

DISPLAY JOBS
Y M C K

IMAGE PROCESSING SYSTEM, IMAGE FORMING APPARATUS, METHOD FOR SHARING DATA, AND NON-TRANSITORY RECORDING MEDIUM FOR STORING COMPUTER READABLE PROGRAM

The present U.S. patent application claims a priority under the Paris Convention of Japanese patent application No. 2016-125070 filed on Jun. 24, 2016, the entirety of which is incorporated herein by reference.

BACKGROUND OF THE INVENTION

1. Field of the Invention

The present invention relates to a technique for distributing common information to a plurality of image forming apparatuses.

2. Description of the Related Art

Recent, years have seen the widespread use of image forming apparatuses into which functions such as copying, network printing, faxing, scanning, and file server function are integrated. Such an image forming apparatus is called a "multifunction device", a "Multi-Functional Peripheral (MFP)", or the like.

Further, a technology has recently been proposed in which a plurality of image forming apparatuses send/receive job data with one another without using a server. For example, a technology has been proposed in which data on job suspended in an image forming apparatus is transferred to another image forming apparatus, and then the job is executed by that another image forming apparatus. Such a technology is sometimes referred to as "ubiquitous printing".

As such an image forming apparatus for sending/receiving data without using a server, the image forming apparatuses described below have been proposed.

One of the image forming apparatuses is an image forming apparatus which includes an operation unit that receives an input of a setting value for each apparatus setting item; a setting information storage unit that stores setting information which is a set of apparatus setting items, setting values, and times of change of the setting values; a setting input information storage unit that stores setting input information which is information input from another apparatus to the image forming apparatus for updating the setting information of the image forming apparatus; a setting output information storage unit that stores setting output information as information for updating the setting information of the other apparatus by being output from the image forming apparatus to the other apparatus; a setting update unit that updates the setting information, setting input information, and setting output information; and a communication unit that receives the setting input information from the other apparatus and transmits the setting output information from the image forming apparatus (English abstract of Japanese Laid-open Patent Publication No. 2015-177522). The use of such image forming apparatuses eliminates the need to use a management server. To be specific, data on device settings which have been set/changed in each of the image forming apparatuses can be synchronised with the other image forming apparatuses without using a management server. In short, the use of such image forming apparatuses enables data sharing.

The other image forming apparatus is an image forming apparatus which includes detection means that detects another electronic device set as a notification destination or management information of each electronic device included in a first electronic device group; request means that, according to attribute information of the detected other electronic device and attribute information of the own device requests the other electronic device to store the fact that a notification destination of the management information of the other electronic device is the own device; and recording means that, according to the attribute information of the other electronic device and the attribute information of the own device, records the other electronic device as a notification destination of the management information of the own device in storage means (English abstract of Japanese Laid-open Patent Publication No. 2012-186560). The image forming apparatus enables data to be shared without using a separate management server as with the image forming apparatus described in Japanese Laid-open Patent Publication No. 2015-177522.

In order for image forming apparatuses to send/receive data therebetween without a server, each of the image forming apparatuses needs to be given information on the other image forming apparatuses, e.g., an IP address thereof.

According to conventional technologies, every time when a new image forming apparatus joins a network, or every time when an old image forming apparatus is replaced with a new image forming apparatus, an administrator is required to work for setting on all of the image forming apparatuses.

As the number of image forming apparatuses to be managed is greater, the work burden placed on the administrator is larger.

To address this, the techniques described in Japanese Laid-open Patent Publication Nos. 2015-177522 and 2012-186560 may be used to enable the image forming apparatuses to automatically exchange information therebetween.

In general, however, the number of sessions that an apparatus can keep active concurrently is limited. Thus, as the number of image forming apparatuses is larger, the time necessary for an image forming apparatus to convey information thereon to all of the other image forming apparatuses is longer.

It is assumed that the number of sessions that can be kept active concurrently is 10, the time from when a session is established until when intended information is sent/received and the session is disconnected is "T", and the number of image forming apparatuses is 80. In such a case, according to the conventional technologies, it takes time of "8T" for an image forming apparatus to convey information thereon to all of the other image forming apparatuses.

SUMMARY

The present invention has been achieved in light of such an issue, and therefore, an object of an embodiment of the present invention is to shorten time required to give information to a plurality of image forming apparatuses as compared to the conventional technologies.

To achieve at least one of the objects mentioned above, according to an aspect, an image processing system includes a plurality of image forming apparatuses; wherein the plurality of image forming apparatuses are classified into any one of groups, a first image forming apparatus is classified into a first group of the groups, the first image forming apparatus being a part of the plurality of image forming apparatuses and being operable to send target data to be shared, and second image forming apparatuses are classified one by one into second groups other than the first group, the second image forming apparatuses being a part of the plurality of image forming apparatuses, the first image forming apparatus performs first transmission processing for sending the target data to each of the second image forming apparatuses, said each of the second image forming apparatuses transfers the target data to image forming apparatuses other than the second image forming apparatuses, the image forming apparatuses being a part of the plurality of image forming apparatuses and being classified into the second group to which said each of the second image forming apparatuses is classified, and the first image forming apparatus performs second transmission processing for sending the target data to an image forming apparatus other than the first image forming apparatus, the image forming apparatus being a part of the plurality of image forming apparatuses and being classified into the first group.

According to another aspect, an image forming apparatus used in a system having a first group and one or more second groups into which a plurality of second image forming apparatuses are classified, and classified into the first group together with a third image forming apparatus, the image forming apparatus includes a transmitter configured to send target data to be shared to the plurality of second image forming apparatuses, one by one, classified into the second groups, and to send the target data to the third image forming apparatus.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIG. 4 is a diagram showing an example of a member table;

FIG. 8 is a diagram showing an example of a group member list;

FIGS. 12A and 12B are diagrams showing examples of a job list screen;

DESCRIPTION OF THE PREFERRED EMBODIMENTS

Hereinafter, an embodiment of the present will be described with reference to the drawings. However, the scope of the invention is not limited to the illustrated examples.

Figure 1:
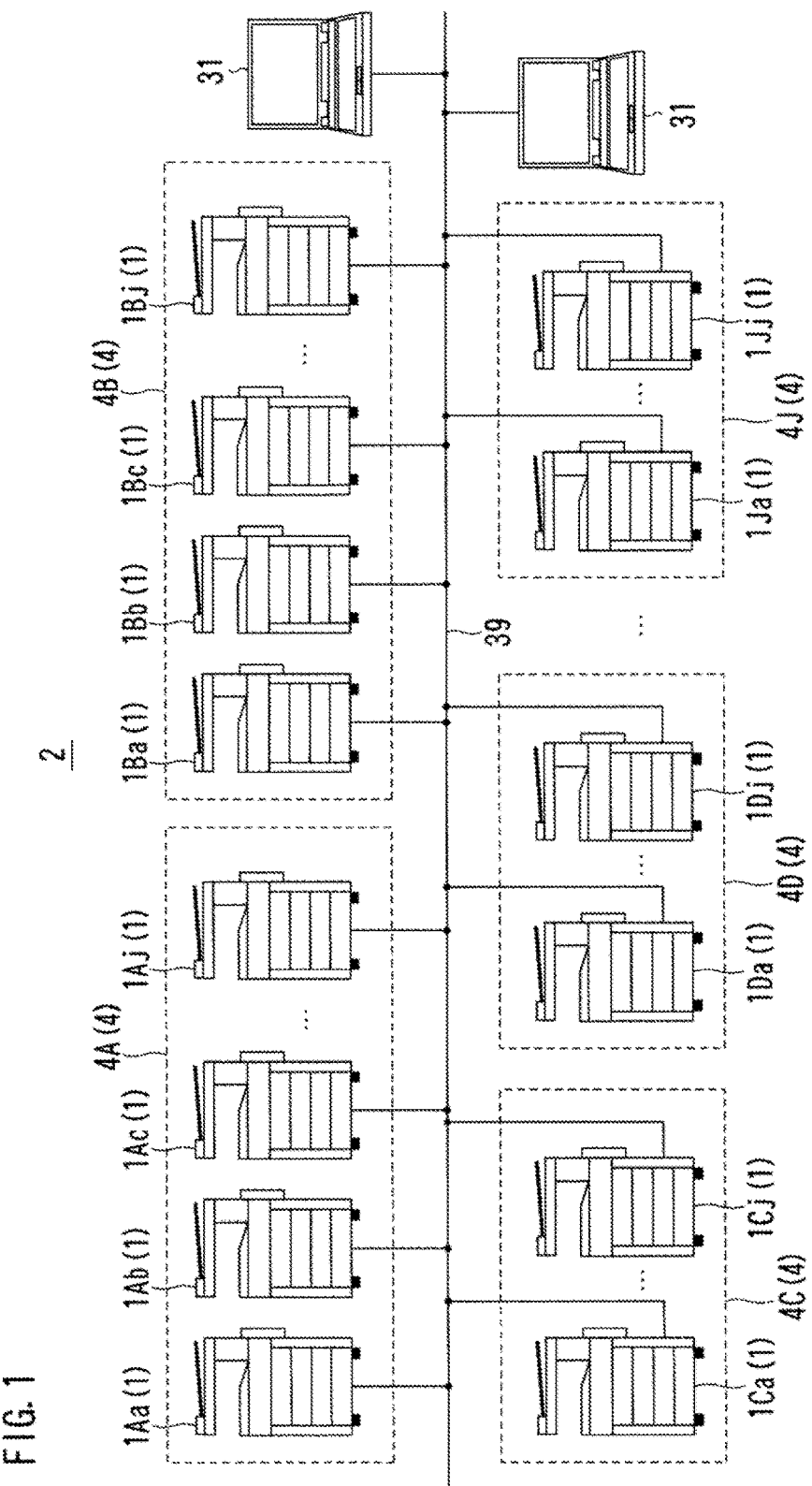
FIG. 1 is a diagram showing an example of the overall configuration of an image processing system.
Figure 2:
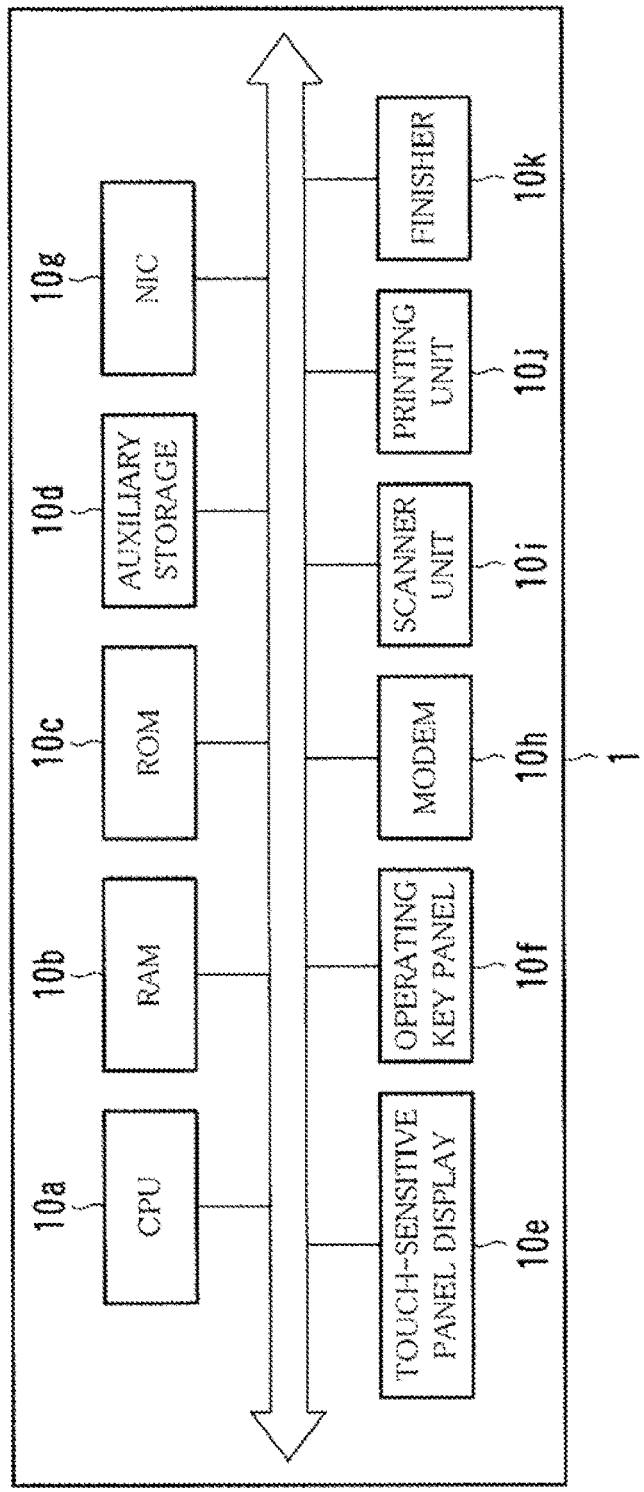
FIG. 2 is a diagram showing an example of the hardware configuration of an image forming apparatus.

FIG. 1 is a diagram showing an example of the overall configuration of an image processing system 2. FIG. 2 is a diagram showing an example of the hardware configuration of an image forming apparatus 1.

As shown in FIG. 1, the image processing system 2 is configured of a plurality of the image forming apparatuses 1, a plurality of terminals 31, a communication line 39, and so on.

Each of the image forming apparatuses 1 and the terminals 31 is given a unique device name and a unique internet Protocol (IP) address. The device name may be a Media Access Control (MAC) address or a host name.

The image forming apparatuses 1 and the terminals 31 are configured to perform communication with one another via the communication line 39. Examples of the communication line 39 include a Local Area Network (LAN), the Internet, a portable telephone network, a public line, and a dedicated line.

The image processing system 2 is to print an image onto paper, or to read an image on paper to generate electronic data of the image.

The image forming apparatus 1 is an apparatus into which functions such as copying, PC printing, faxing, scanning, and box function are incorporated. The image forming apparatus 1 is generally called a "multifunction device" or a "Multi-Functional Peripheral (MFP)".

The PC printing function is to print an image onto paper based on image data received from the terminal 31. The PC printing function is sometimes called a "network printing function" or "network printer function".

According to the box function, each user is given a storage area, called a "box" or a "personal box". The box function enables each user to save image data and so on to his/her storage area and to manage the image data therein. The box corresponds to a "folder" or a "directory" in a personal computer.

Further, some of the image forming apparatuses 1 have a storage server function. According to the storage server function, when being given a job, the image forming apparatus 1 suspends the job instead of promptly executing the same. In response to a command given later by a user, the image forming apparatus 1 executes the job suspended or transfer the job suspended to another image forming apparatus 1.

For example, when receiving a PC printing job from the terminal 31, the image forming apparatus 1 suspends the PC printing job. Thereafter, when the user operates a touch-sensitive, panel display 10e to give a command to execute the PC printing job, the image forming apparatus 1 executes the PC printing job. Alternatively, when the user operates another image forming apparatus 1 to give a command to receive the PC printing job, the job is transferred to that another image forming apparatus 1.

Each of the image terming apparatuses 1 is in any one of a plurality of groups 4. Each of the groups 4 is given, in advance, a unique group code as an identifier.

Hereinafter, an example is described in which one hundred (100) image forming apparatuses 1 are provided in the image processing system 2, ten groups 4 are prepared, and each group 4 has ten image forming apparatuses 1.

The groups 4 are sometimes referred to as a "group 4A", a "group 4B", a "group 4C", . . . , and a "group 4J" to distinguish one from another.

The ten image forming apparatuses 1 of the group 4A are sometimes referred to as an "image forming apparatus 1Aa", an "image forming apparatus 1Ab", an "image forming apparatus 1Ac", . . . , and an "image forming apparatus 1Aj" to distinguish one from another. Other image forming apparatuses 1 of the other groups 4 are also sometimes described in the same manner.

One of the image forming apparatuses 1 of one group 4 (ten apparatuses in this embodiment) functions as a group manager.

The group manager serves to collect and organize information on attributes of the image forming apparatuses 1 of the same group 4 as that of the group manager to convey the information to the other groups 4. The group manager also serves to obtain information on attributes of the image forming apparatuses 1 of the other groups 4 to convey the information to the other image forming apparatuses 1 of the same group 4 as that of the group manager.

It is also possible to use the image forming apparatus 1 having a so-called topology manager function as the group manager.

As described earlier, in the image processing system 2, some of the image forming apparatuses 1 have the storage server function and the other image forming apparatuses 1 do not. Hereinafter, the image forming apparatus 1 having the storage server function is sometimes referred to as a "storage server" and the image forming apparatus 1 without the storage server function is sometimes referred to as a "client".

The image forming apparatuses 1 functioning as the group manager are classified as the storage server or the client.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, the touch-sensitive panel display 10e, an operating key panel 10f, a Network Interface Card (NIC) 10g, a modem 10h, a scanner unit 10i, a printing unit 10j, a finisher 10k, and so on.

The touch-sensitive panel display 10e displays, for example, a screen for presenting messages to the user, a screen for allowing the user to input commands or information, a screen for showing the results of processing executed, by the CPU 10a. The touch-sensitive panel display 10e sends a signal indicating a touched location to the CPU 10a.

The operating key panel 10f is a so-called hardware keyboard. The operating key panel 10f has numeric keys, a start, key, a stop key, and a function key.

The NIC 10g performs communication with another device in accordance with a protocol, such as Transmission Control Protocol/Internet Protocol (TCP/IP). However, the number of sessions that can be kept active concurrently is limited. In this embodiment, an example is described in which the maximum number of sessions that can be kept active concurrently is 9.

The modem 10h sends and receives image data with a facsimile terminal in accordance with a protocol such as G3.

The scanner unit 10i optically reads an image on a sheet of paper placed on a platen glass to generate image data thereof.

The printing unit 10j prints, onto paper, an image captured by the scanner unit 10i and an image sent by another device by using the NIC 10g or the modem 10h.

The finisher 10k applies a post-process, if necessary, to a printed matter obtained by the printing unit 10j. The post-process includes stapling the printed matter with a stapler, punching a hole in the printed matter, and folding the printed matter.

The ROM 10c or the auxiliary storage 10d stores, therein, a program for implementing the foregoing functions such as copying. The ROM 10c or the auxiliary storage 10a also stores, therein, a member information management program 10P. The member information management program 10P is described later.

The programs are loaded into the RAM 10b as necessary, and are executed by the CPU 10a. The auxiliary storage 10d is, for example, a hard disk drive or a Solid State Drive (SSD).

The member information management program 10P enables attributes of a member of the group 4 (namely, an image forming apparatus 1) to be conveyed to the other members or to be reflected in a table of the subject member faster than is conventionally possible. The mechanism thereof is described below.

Figure 3:
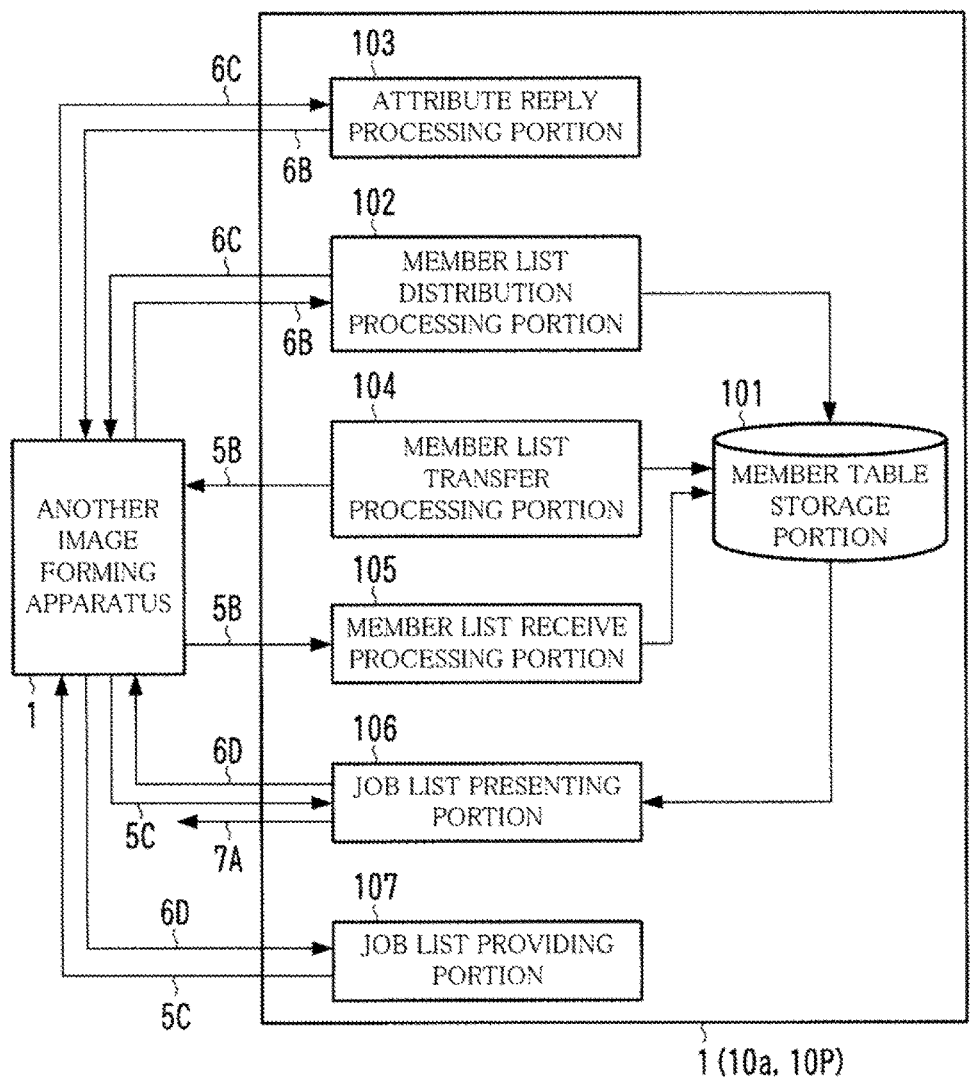
FIG. 3 is a diagram showing an example of the functional configuration of an image forming apparatus.
Figure 5:
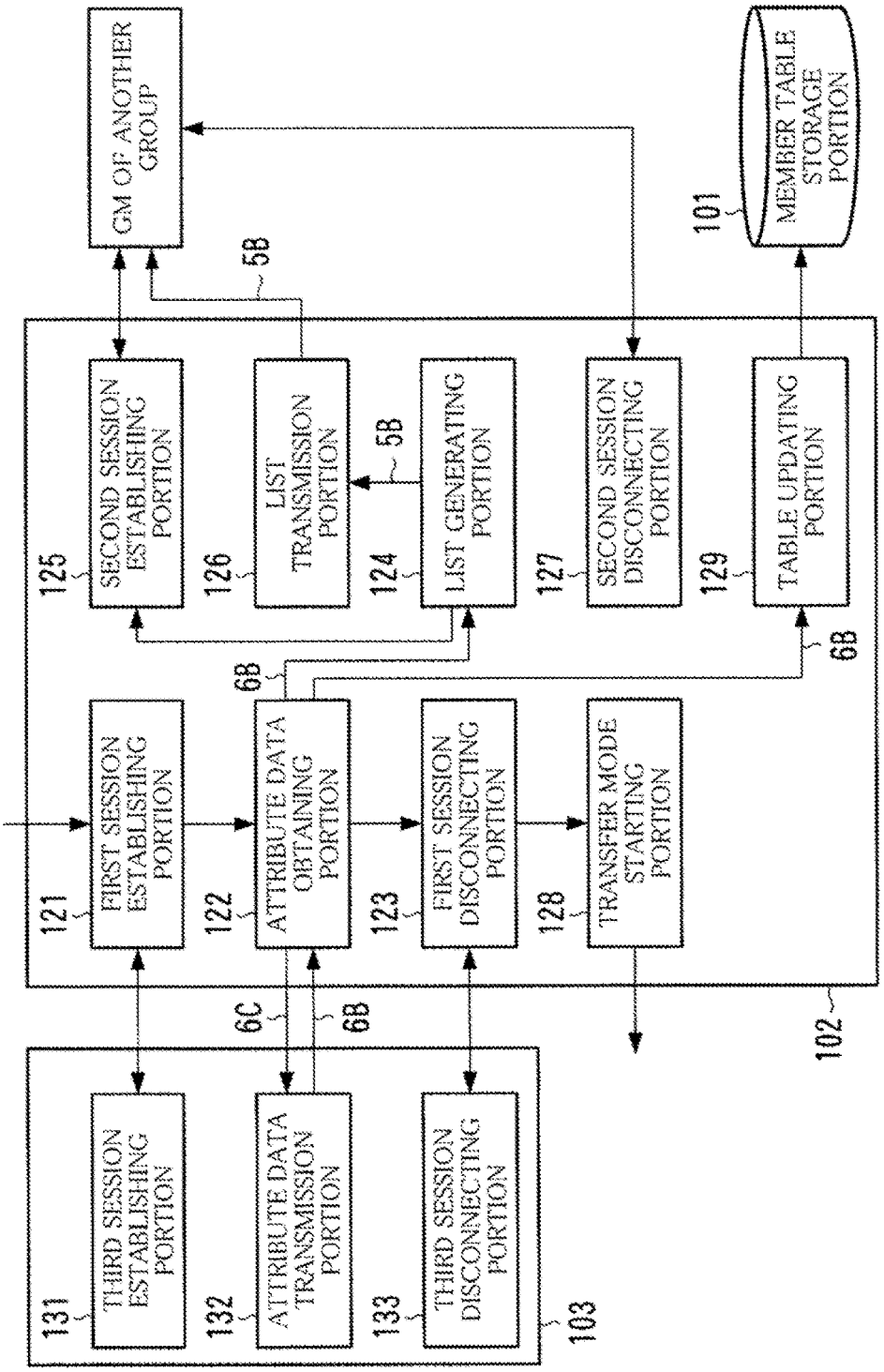
FIG. 5 is a diagram showing an example of the configuration of a member list distribution processing portion and the configuration of an attribute reply processing portion.
Figure 6:
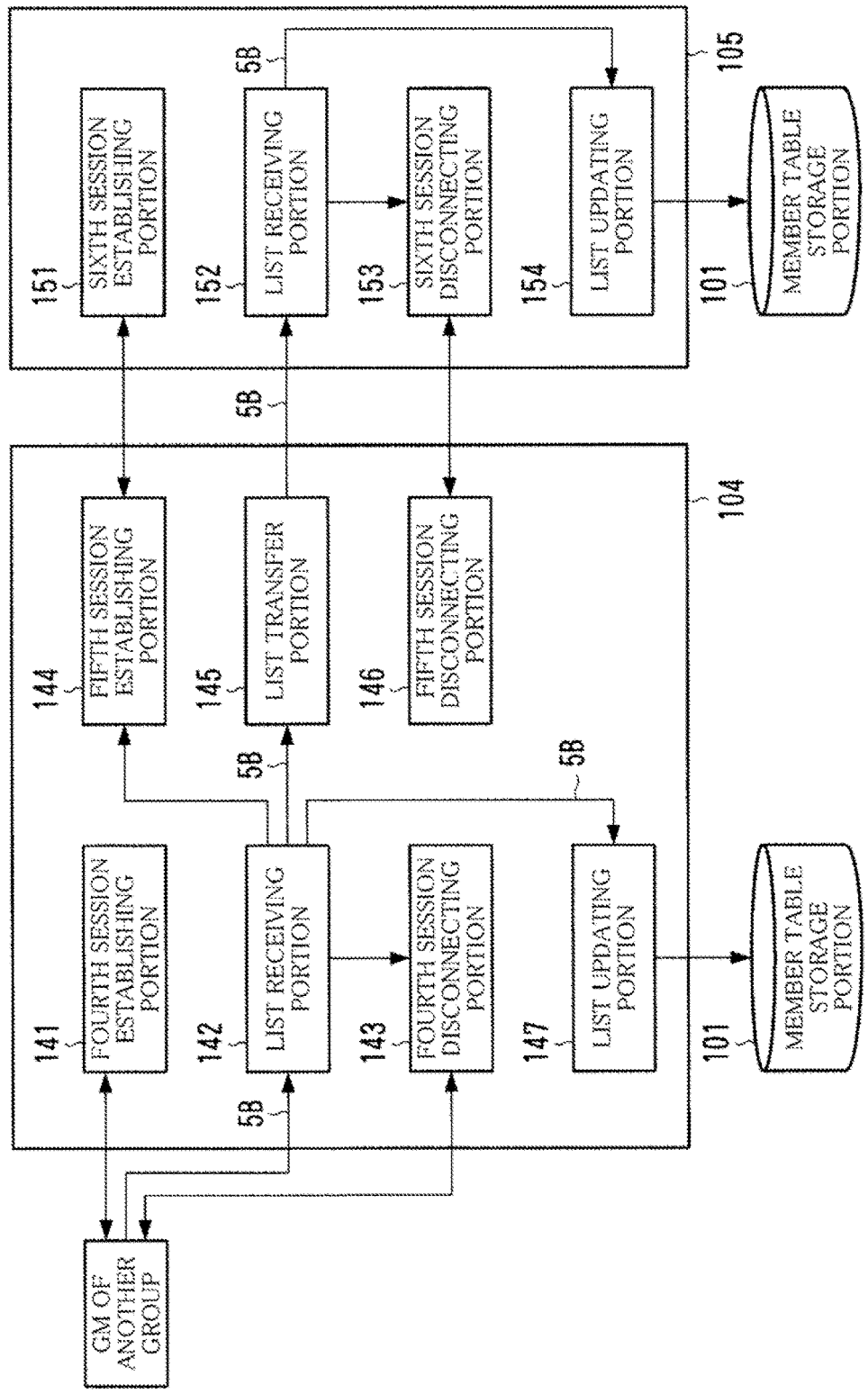
FIG. 6 is a diagram showing an example of the configuration of a member list transfer processing portion, and the configuration of a member list receive processing portion.

FIG. 3 is a diagram showing an example of the functional configuration of the image forming apparatus 1. FIG. 4 is a diagram showing an example of a member table 5. FIG. 5 is a diagram showing an example of the configuration of a member list distribution processing portion 102 and the configuration of an attribute reply processing portion 103. FIG. 6 is a diagram showing an example of the configuration of a member list transfer processing portion 104 and the configuration of a member list receive processing portion 105.

The member information management program 10P implements the functions of a member table storage portion 101, the member list distribution processing portion 102, the attribute reply processing portion 103, the member list transfer processing portion 104, the member list receive processing portion 105, a job list presenting portion 106, a job list providing portion 107, and so on, all of which are shown in FIG. 3.

The member table storage portion 101 stores a member table 5A therein. Referring to FIG. 4, the member table 5A stores a set of attribute data 6A for each of the image forming apparatuses 1.

The attribute data 6A indicates a device name, IP address, and type of the corresponding image forming apparatus 1, and a group code of the group 4 to which the corresponding image forming apparatus 1 belongs.

The type shows that the corresponding image forming apparatus 1 is a group manager, storage server, or client. Where the corresponding image forming apparatus 1 is a group manager, "GM" is indicated as the type. Where the corresponding image forming apparatus 1 is a storage server, "ST" is indicated as the type. Where the corresponding image forming apparatus 1 is a client, "CL" is indicated as the type.

The attribute data 6A for some of the image forming apparatuses 1 is, however, not stored in the member table 5A in some cases. Some of the foregoing item information is not indicated in the attribute data 6A in some cases.

In the member table 5A stored in the member table storage portion 101 of the image forming apparatus 1 working as the group manager, a plurality of sets of attribute data 6A on group managers of the other groups 4 are stored in advance. The sets of attribute data 6A indicate, in advance, at least IP addresses and types. Further, in the member table 5A stored in the member table storage portion 101 of the image forming apparatus 1 working as the group manager, a plurality of sets of attribute data 6A on the other image forming apparatuses 1 of the group 4 of the image forming apparatus 1 working as the group manager are stored in advance. The sets of attribute data 6A indicate, in advance, at least IP addresses and group codes.

A plurality of the image forming apparatuses 1 work in coordination to generate or update the attribute data 6A. At this time, in the image forming apparatuses 1, the member list distribution processing portion 102, the attribute reply processing portion 103, the member list transfer processing portion 104, and the member list receive processing portion 105 operate.

The description goes on to processing by the member list distribution processing portion 102, the attribute reply processing portion 103, the member list transfer processing portion 104, and the member list receive processing portion 105 by taking an example in which the attribute data 6A of each of the image forming apparatuses 1 of the group 4A is generated or updated.

In the image forming apparatus 1 working as the group manager of the group 4A, the member list distribution processing portion 102 operates. Hereinafter, an example is described in which an image forming apparatus 1Aa is the group manager of the group 4A.

Referring to FIG. 5, the member list distribution processing portion 102 is configured of a first session establishing portion 121, an attribute data obtaining portion 122, a first session disconnecting portion 123, a list generating portion 124, a second session establishing portion 125, a list transmission portion 126, a second session disconnecting portion 127, a transfer mode starting portion 128, a table updating portion 129, and so on.

The member list distribution processing portion 102 primarily gathers data on attributes of each member of a group of the image forming apparatus 1Aa, namely, the group 4A, and distributes the data gathered to group managers of the other groups 4 (4B, 4C, . . . , 4J). The processing by the individual portions of the member list distribution processing portion 102 is described later.

In each of the image forming apparatuses 1 of the group 4A other than the group manager, the attribute reply processing portion 103 works.

Referring to FIG. 5, the attribute reply processing portion 103 is configured of a third session establishing portion 131, an attribute data transmission portion 132, a third session disconnecting portion 133, and so on.

The attribute reply processing portion 103 gives a reply of attributes of the subject image forming apparatus 1 to the group manager of the group 4 of its own (the image forming apparatus 1Aa in this embodiment). In other words, the attribute reply processing portion 103 provides data on the attributes of the subject image forming apparatus 1 to the group manager of the group 4. The processing by the individual portions of the attribute reply processing portion 103 is described later.

In each of the image forming apparatuses 1 working as the group manager of the groups 4 other than the group 4A, the member list transfer processing portion 104 works.

Referring to FIG. 6, the member list transfer processing portion 104 is configured of a fourth session establishing portion 141, a list receiving portion 142, a fourth session disconnecting portion 143, a fifth session establishing portion 144, a list transfer portion 145, a fifth session disconnecting portion 146, a list updating portion 147, and so on.

The member list transfer processing portion 104 primarily receives the data on attributes from the group manager of the group 4A to update the member table 5A of the subject image forming apparatus 1. The member list transfer processing portion 104 also transfers the data on attributes to the other image forming apparatuses 1 of the group 4 of the subject image forming apparatus 1. The processing by the individual portions of the member list transfer processing portion 104 is described later.

In the group manager of the group 4A, a part of the member list transfer processing portion 104 operates as discussed later.

In each of the image forming apparatuses 1 that are not group managers of the groups 4 other than the group 4A, the member list receive processing portion 105 operates.

Referring to FIG. 6, the member list receive processing portion 105 is configured of a sixth session establishing portion 151, a list receiving portion 152, a sixth session disconnecting portion 153, a list updating portion 154, and so on.

The member list receive processing portion 105 receives the data on attributes from the group manager of the same group 4 as that, of the subject image forming apparatus 1 to update the member table 5A of the subject image forming apparatus 1. The processing by the individual portions of the member list receive processing portion 105 is described later.

The description goes on to the processing of the individual portions shown in FIGS. 5 and 6 with reference to FIGS. 7-12.

[Collecting Data on Attributes]

Figure 7:
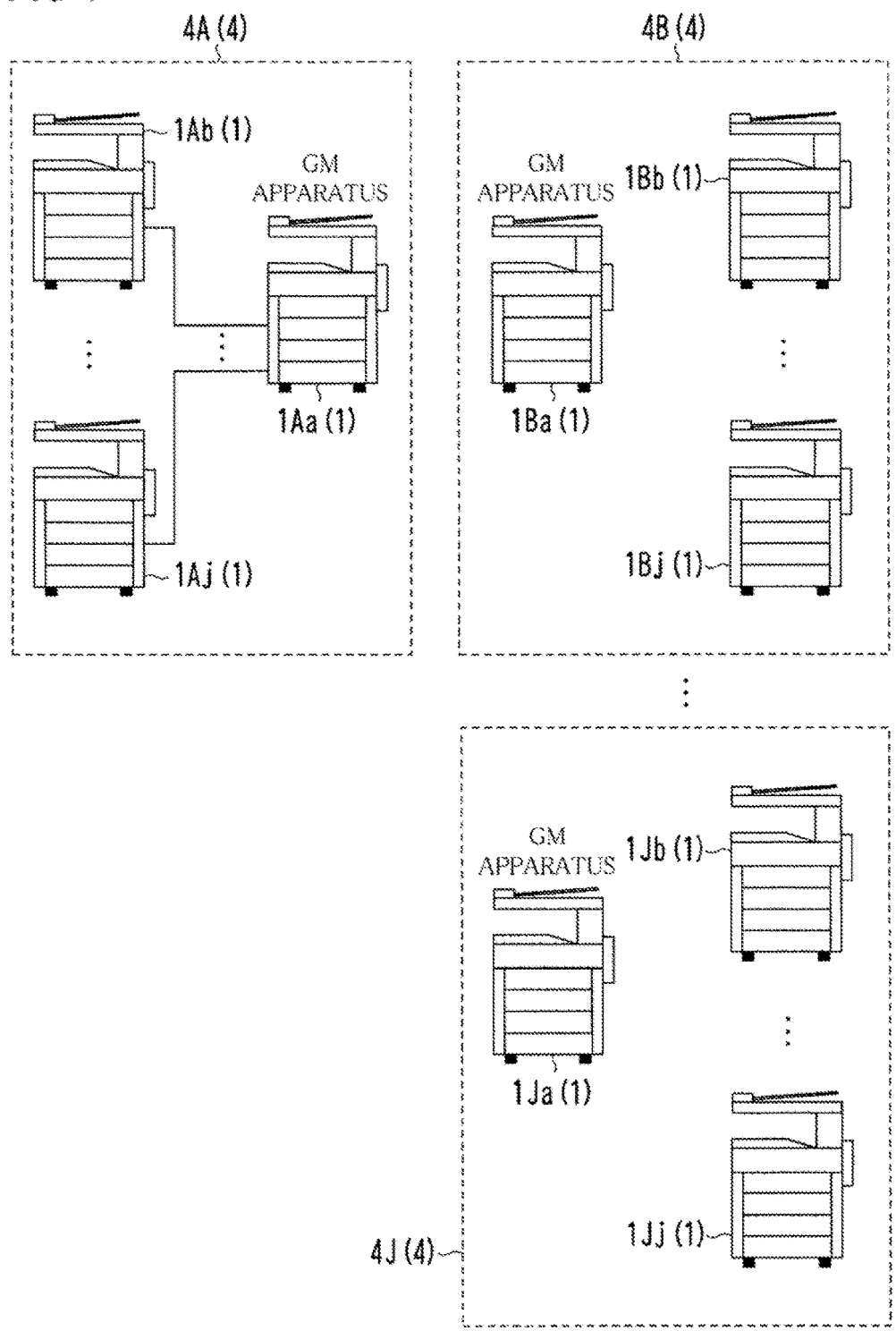
FIG. 7 is a diagram showing an example of sessions in a first phase.

FIG. 7 is a diagram showing an example of sessions in a first phase.

It is assumed that, at the start of the member information management program 10P, the image forming apparatus 1 that is a group manager of each of the groups 4 establishes no sessions. It is also assumed that, at the start of the member information management program 10P, the other image forming apparatuses 1 establish eight or smaller sessions, namely, keeps eight or smaller sessions active.

With the image forming apparatus 1Aa, in response to a predetermined command (hereinafter, referred to as a "distribute command") executed, the first session establishing portion 121 of the member list distribution processing portion 102 performs processing for establishing a session with each of the other image forming apparatuses 1 of the group 4A, namely, each of the nine image forming apparatuses 1Ab-1Aj.

At this time, the third session establishing portion 131 of the attribute reply processing portion 103 of each of the image forming apparatuses 1Ab-1Aj performs processing for establishing a session in coordination with the first session establishing portion 121 of the image forming apparatus 1Aa.

The first session establishing portion 121 and the third session establishing portion 131 preferably perform, the processing for establishing a session by using a conventional method. The same is applied to the processing for establishing a session described later.

Every time a session is established, the attribute data obtaining portion 122 obtains attribute data 6B from the other end of the session (one of the image forming apparatuses 1Ab-1Aj) in the following manner.

The attribute data obtaining portion 122 sends attribute request data 6C through the session to the other end of the session. For example, when a session is established with the image forming apparatus 1Ab, the attribute data obtaining portion 122 sends the attribute request data 6C to the image forming apparatus 1Ab.

Since the first session establishing portion 121 establishes a session with each of the image forming apparatuses 1Ab-1Aj, the attribute data obtaining portion 122 sends the attribute request data 6C to each of the image forming apparatuses 1Ab-1Aj.

With each of the image forming apparatuses 1Ab-1Aj, the attribute data transmission portion 132 receives the attribute request data 6C from, the image forming apparatus 1Aa, and sends, as the attribute data 6B, data indicating a device name, an IP address, and a type of the subject image forming apparatus 1 to the image forming apparatus 1Aa through the session with the image forming apparatus 1Aa.

With the image forming apparatus 1Aa, the attribute data obtaining portion receives the attribute data 6B from each of the image forming apparatuses 1Ab-1Aj.

The foregoing processing is performed, so that the sessions of the image forming apparatus 1Aa with the individual image forming apparatuses 1Ab-1Aj are established around the same time as shown in FIG. 7. This enables the image forming apparatus 1Aa to gather the attribute data 6B on each of the image forming apparatuses 1Ab-1Aj.

With the image forming apparatus 1Aa, when the attribute data obtaining portion 122 obtains the attribute data 6B, the first session disconnecting portion 123 performs processing for disconnecting the session with the transmission source of the attribute data 6B in coordination with the third session disconnecting portion 133 of the transmission source. The processing is preferably performed by using a conventional method. The same is applied, to the processing for disconnecting a session described later.

[Distributing Data on Attributes]

Figure 9:
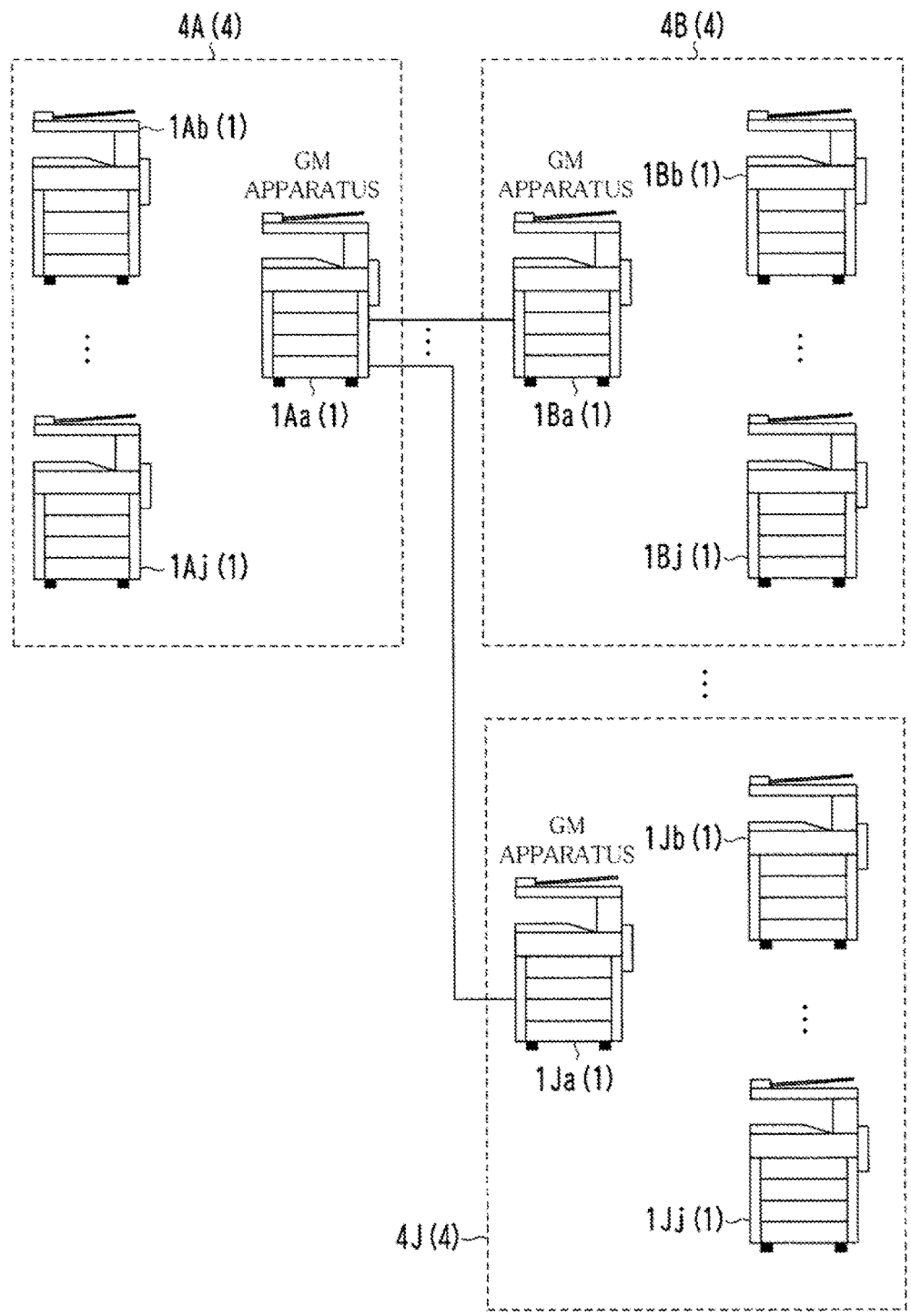
FIG. 9 is a diagram showing an example of sessions in a second phase.
Figure 10:
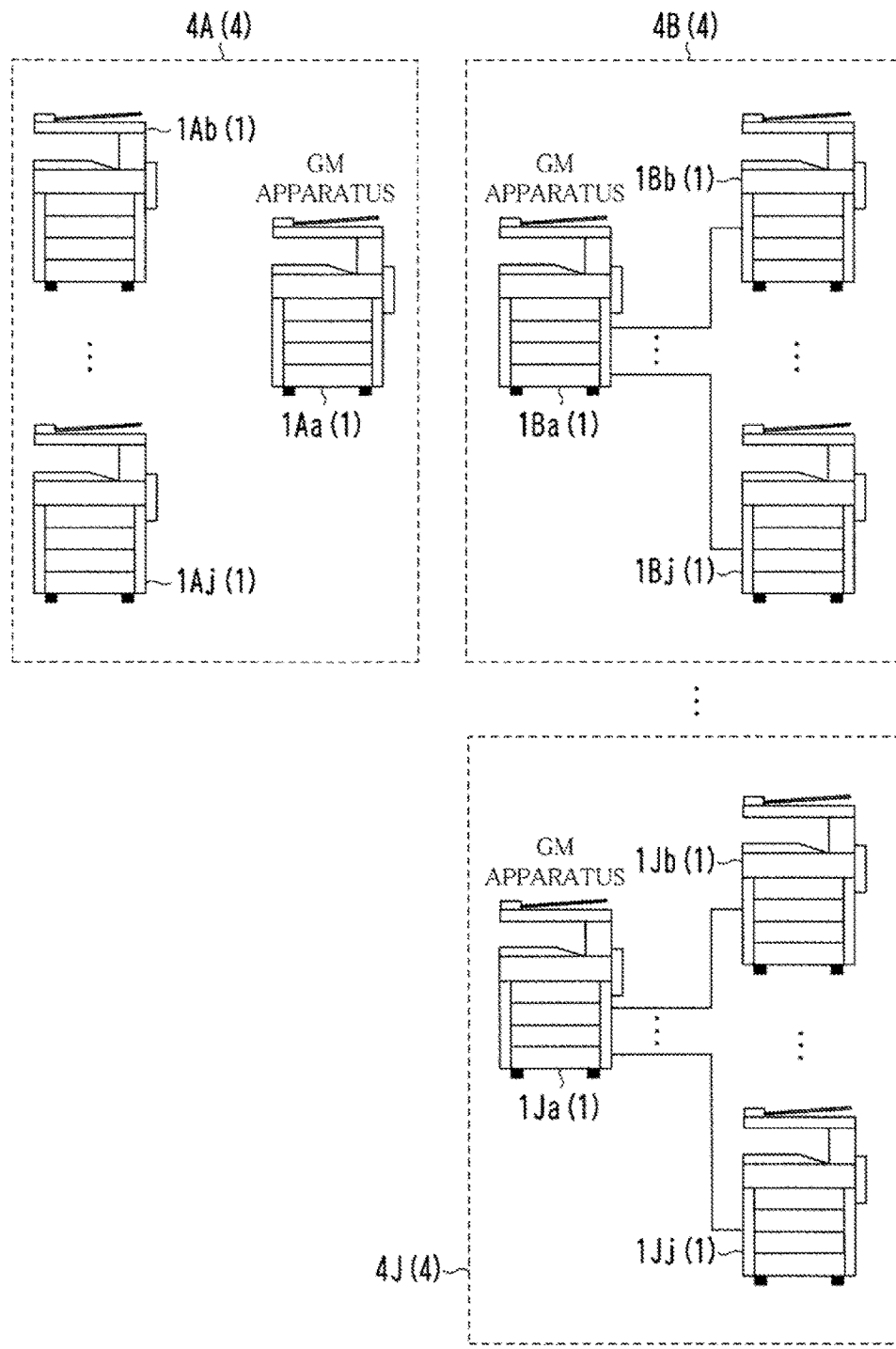
FIG. 10 is a diagram showing an example of sessions in a third phase.

FIG. 8 is a diagram showing an example of a group member list 5B. FIG. 9 is a diagram showing an example of sessions in a second phase. FIG. 10 is a diagram showing an example of sessions in a third phase.

With the image forming apparatus 1Aa, when the attribute data obtaining portion 122 obtains the attribute data 6B from each of the image forming apparatuses 1Ab-1Aj, the list generating portion 124 generates the group member list 5B as shown in FIG. 8 by putting together the attributes indicated in the sets of the attribute data 6B and the attributes of the subject image forming apparatus 1Aa and adding a group code of the group 4A.

The second session establishing portion 125 performs processing for establishing a session with each of the group managers of the other groups 4 (4B-4J).

At this time, with each of the group managers of the groups 4B-4J, the fourth session establishing portion 141 of the member list transfer processing portion 104 performs processing for establishing a session with the image forming apparatus 1Aa in coordination with the second session establishing portion 125 of the image forming apparatus 1Aa.

Every time a session is established, the list transmission portion 126 sends data on the group member list 5B through the session to the other end of the session.

It is assumed that the group manager of the group 4B is the image forming apparatus 1Ba. In such a case, when a session with the image forming apparatus 1Ba is established, the list transmission portion 126 sends the data on the group member list 5B to the image forming apparatus 1Ba.

Since the second session establishing portion establishes a session with each of the group managers of the groups 4B-4J, the list transmission portion 126 sends the data on the group member list 5B to each of the group managers of the groups 4B-4J.

With each of the group managers, the list receiving portion 142 receives the data on the group member list 5B.

The following description takes an example in which the group managers of the groups 4B, 4C, . . . and 4J are the individual first image forming apparatuses 1, namely, the image forming apparatuses 1Ba, 1Ca, . . . , and 1Ja.

Through the foregoing processing, the image forming apparatus 1Aa establishes the sessions with the individual image forming apparatuses 1Ba-1Ja concurrently as shown in FIG. 9, so that the image forming apparatus 1Aa sends the data on the group member list 5B to each of the image forming apparatuses 1Ba-1Ja.

With each of the image forming apparatuses 1Ba-1Ja, the fourth session disconnecting portion 143 performs processing for disconnecting the session with the transmission source of the data on the group member list 5B, i.e., the image forming apparatus 1Aa, in coordination with the second session disconnecting portion 127 of the transmission source.

The fifth session establishing portion 144, the list transfer portion 145, and the fifth session disconnecting portion 146 perform processing for transferring the data on the group member list 5B to the other image forming apparatuses 1 of the same group 4 as that of the subject image forming apparatus 1. The processing is described below by talking an example of the processing performed in the group 4B.

With the image forming apparatus 1Ba, the fifth session establishing portion 144 performs processing for establishing a session with each of the image forming apparatuses 1Bb-1Bj.

At this time, with each of the image forming apparatuses 1Bb-1Bj, the sixth session establishing portion 151 of the member list receive processing portion 105 performs processing for establishing a session with the image forming apparatus 1Ba in coordination with the fifth session establishing portion 144 of the image forming apparatus 1Ba.

Every time a session is established, the list transfer portion 145 of the image forming apparatus 1Ba transfers the data on the group member list 5B through the session to the other end or the session (one or the image forming apparatuses 1Bb-1Bj).

With each of the image forming apparatuses 1Bb-1Bj, the list receiving portion 152 receives the data on the group member list 5B.

In response to the data on the group member list 5B received, the sixth session disconnecting portion 153 performs processing for disconnecting the session with the transmission source of the data on the group member list 5B, i.e., the image forming apparatus 1Ba, in coordination with the fifth session disconnecting portion 146 of the transmission source.

Through the foregoing processing, the image forming apparatus 1Ba establishes the sessions with the individual image forming apparatuses 1Bb-1Bj concurrently as shown in FIG. 10, so that the image forming apparatus 1Ba sends the data, on the group member list 5B to each of the image forming apparatuses 1Bb-1Bj.

As in the groups 4C-4J, the processing discussed above is performed by the fifth session establishing portion 144, the list transfer portion 145, and the fifth session disconnecting portion 146 of the image forming apparatus 1 that works as the group manager, and the sixth session establishing portion 151, the list receiving portion 152, and the sixth session disconnecting portion. 153 of the image forming apparatus 1 that is not the group manager.

Thereby, in the group 4J for example, the image forming apparatus 1Ja establishes sessions with the individual image forming apparatuses 1Jb-1Jj concurrently as shown in FIG. 10, so that the image forming apparatus 1Ja sends the data on the group member list 5B to the individual image forming apparatuses 1Jb-1Jj.

With the image form apparatus 1Aa, when the list generating portion 124 generates the group member list 5B, the transfer mode starting portion 128 (see FIG. 5) starts the fifth session establishing portion 144, the list transfer portion 145, and the fifth session disconnecting portion 146 of the member list transfer processing portion 104.

The fifth session establishing portion 144, the list transfer portion 145, and the fifth session disconnecting portion 146 perform processing for transmitting the data on the group, member list 5B to the other image forming apparatuses 1 (1Ab-1Aj) of the group 4A in the following manner.

If there is an available resource for session, then the fifth session establishing portion 144 establishes a session with, among the image forming apparatuses 1Ab-1Aj, the image forming apparatus 1 to which the data on the group member list 5B has not yet been sent.

After that, the fifth session establishing portion 144, the list transfer portion 145, and the fifth session disconnecting portion 146 perform the processing as discussed above. At this time, in the image forming apparatuses 1Ab-1Aj, the individual portions of the member list receive processing portion 105 perform the processing as discussed above.

Thereby, as shown in FIG. 7, the image forming apparatus 1Aa establishes sessions with the individual image forming apparatuses 1Ab-1Aj around the same time or in sequence. This enables the image forming apparatus 1Aa to send the data on the group member list 5B to each of the image forming apparatuses 1Ab-1Aj.

The foregoing processing is performed, so that the data on the group member list 5B is distributed to all of one hundred (100) image forming apparatuses 1.

[Updating Member Table 5A]

The table updating portion 129 of the group manager of the group 4A, namely, the table updating portion 129 of the image forming apparatus 1Aa performs, in parallel with the processing for sending the data on the group member list 5B to the other groups 4, or before or after the processing, perform processing for updating the member table 5A (see FIG. 4) stored in the member table storage portion 101 of the subject image forming apparatus 1Aa in the following manner.

The table updating portion 129 makes the first record (line) of the group member list 5B as a target. The target record is hereinafter referred, to as a "record of interest".

Where the member table 5A does not store the attribute data 6A indicating a device name contained in the record of interest, the table updating portion 129 generates data which indicates the content of the record of interest, e.g., device name, group code, IP address, and type of the record of interest, and adds the generated data to the member table 5A as a new set of attribute data 6A.

Alternatively, where the member table 5A stores the attribute data 6A indicating the device name contained in the record of interest, the table updating portion 129 overwrites the content of the attribute data 6A, e.g., device name, group code, IP address, and type of the attribute data 6A, with the content indicated in the record of interest. It is noted, however, that an item having the same content is not necessary to be overwritten.

The table updating portion 129 makes, as a target, the second record and onward of the group member list 5B appropriately in the same manner as that in the first record, generates a new set of attribute data 6A, stores the new set of attribute data 6A into the member table 5A, or, alternatively, overwrites the existing attribute data 6A.

The list updating portion 147 of each of the group managers of the groups 4 other than the group 4A, namely, the list updating portion 147 of each of the image forming apparatuses 1Ba-1Ja, performs, in parallel with the processing for transferring the data on the group member list 5B, or before or after the processing, processing for updating the member table 5A stored in the member table storage portion 101 of the subject image forming apparatus 1. The method of processing is the same as that by the table updating portion 129.

When the list receiving portion 152 receives the data on the group member list 5B, the list updating portion 154 of each of the image forming apparatuses 1 that are not group managers performs processing for updating the member table 5A stored in the member table storage portion 101 of the subject image forming apparatus 1. The method of processing is the same as that by the table updating portion 129.

[Providing Job List]

Figure 11:
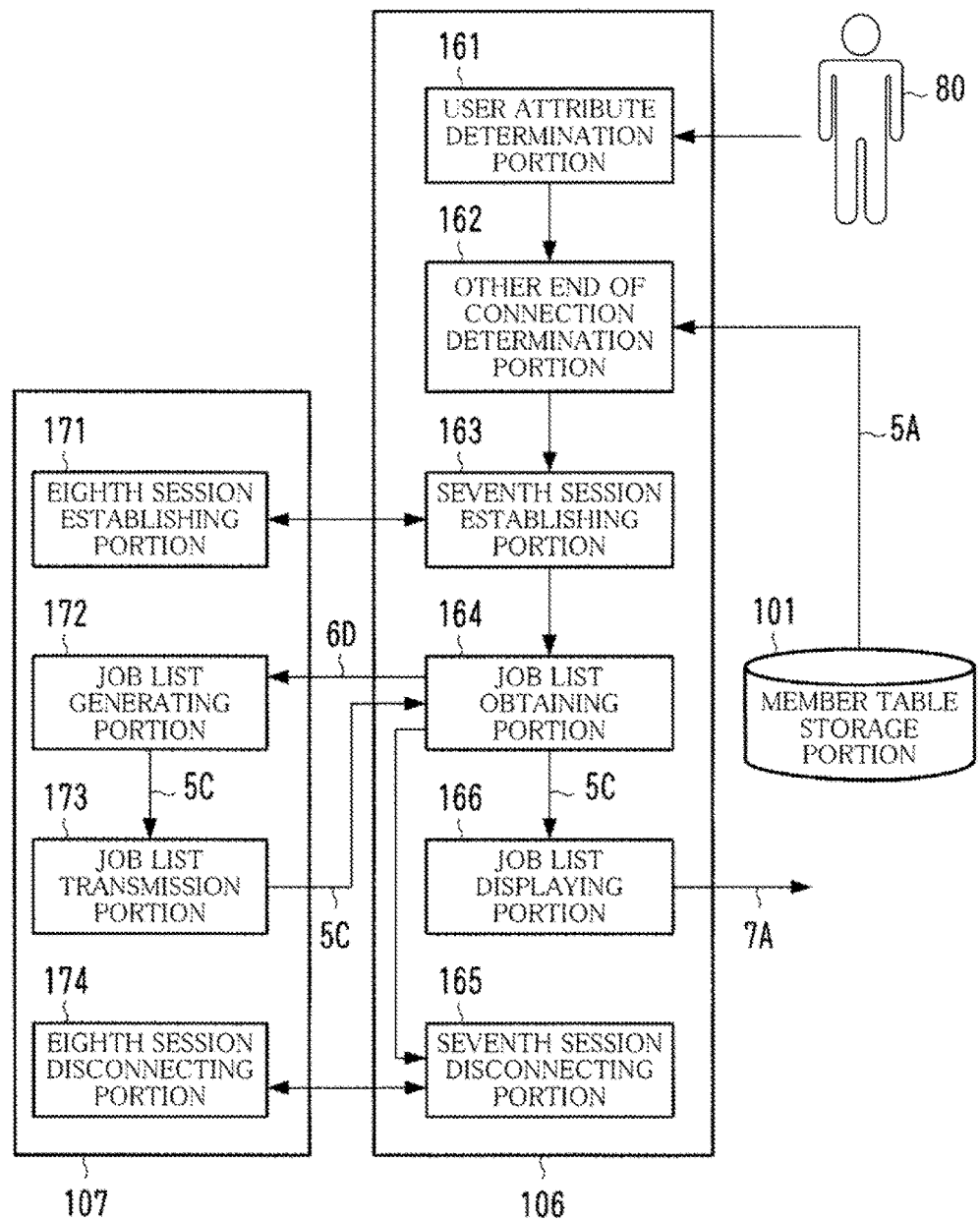
FIG. 11 is a diagram showing an example of the configuration of a job list presenting portion and the configuration of a job list providing portion.

FIG. 11 is a diagram showing an example of the configuration of the job list presenting portion 106 and the configuration of the job list providing portion 107. FIGS. 12A and 12E are diagrams showing an example of a job list screen 7A.

The image forming apparatus 1 is configured to obtain a list of jobs suspended in the other image forming apparatuses 1 working as storage servers, and to present the list to the user. The mechanism thereof is described below by taking an example in which the image forming apparatus 1Cj obtains a list of jobs and presents the list to the user 80.

It is supposed that all of the image forming apparatuses 1 belonging to the same group 4 are installed on the same location.

Referring to FIG. 11, the job list presenting portion 106 of FIG. 3 is configured of a user attribute determination portion 161, an other end of connection determination portion 162, a seventh session establishing portion 163, a job list obtaining portion 164, a seventh session disconnecting portion 165, a job list displaying portion 166, and so on.

The job list presenting portion 106 obtains a job list from the image forming apparatus 1 that works as a storage server and presents the list to the user 80. In this example, the job list presenting portion 106 operates in the image forming apparatus 1Cj.

Referring to FIG. 11, the job list providing portion 107 is configured of an eighth session establishing portion 171, a job list generating portion 172, a job list transmission portion 173, an eighth session disconnecting portion 174, and so on.

The job list providing portion 107 provides the request source with a list of jobs suspended in the subject image forming apparatus 1. In this example, the job list providing portion 107 operates in the image forming apparatus 1 that works as a storage server.

The user 80 logs into the image forming apparatus 1Cj to enter a predetermined command (hereinafter, referred to as a "job presentation command") into the image forming apparatus 1Cj. In response to this operation, the user attribute determination portion 161 determines whether or not the user 80 is a user who usually uses the image forming apparatus 1Cj (normal user) or a user who temporarily uses the image forming apparatus 1Cj such as a visiting employee (guest user), for example, in the following manner.

The user attribute determination portion 161 asks a server or the like about a location of a division of the user 80. If the location answered by the server is the same as the location where the image forming apparatus 1Cj is installed, then the user attribute determination portion 161 determines that the user 80 is a normal user. Otherwise, the user attribute determination portion 161 determines that the user 80 is a guest user.

Alternatively, the user attribute determination portion 161 determines that the user 80 is a normal user if a user account used by the user 80 to log into the image forming apparatus 1Cj is a specific user account. Otherwise, the user attribute determination portion 161 determines that the user 80 is a guest user.

Depending on the result of determination by the user attribute determination portion 161, the other end of connection determination portion 162 determines a party to be connected with the subject image forming apparatus 1 (hereinafter, referred to as an "other end of the connection") in the following manner.

If the user attribute determination portion 161 determines that the user 80 is a normal user, then the other end of connection determination portion 162 determines that the other end of the connection is the image forming apparatus 1 that is in the same group 4 as that of the subject image forming apparatus 1Cj, namely, in the group 4C and works as a storage server. The user attribute determination portion 161 can make such a determination based on the member table 5A as shown in FIG. 4.

If the user attribute determination portion 161 determines that the user 80 is a guest user, then the other end of connection determination portion 162 determines, that the other end of the connection is the image forming apparatus 1 that is in a group 4 different from that of the subject image forming apparatus 1Cj, namely, in any one of groups 4 other than the group 4C and works as a storage server. The user attribute determination portion 161 can make such a determination also based on the member table 5A as shown in FIG. 4.

The seventh session establishing portion 163 performs processing for establishing a session with the image forming apparatus 1 that is determined to be the other end of the connection by the other end of connection determination portion 162.

At this time, in the image forming apparatus 1 determined to be the other end of the connection, the eighth session establishing portion 171 performs processing for establishing a session with the image forming apparatus 1Cj.

The job list obtaining portion 164 sends job list request data 6D to each of the other ends of the connections with which the sessions are established.

With each or the other ends of the connections, the job list generating portion 172 receives the job list request data 60 from the image forming apparatus 1Cj and generates a list of jobs suspended in the subject image forming apparatus 1 (hereinafter, referred to as a "job list 5C").

The job list transmission portion 173 sends data on the job list 5C to the image forming apparatus 1Cj.

With the image forming apparatus 1Cj, the job list obtaining portion 164 receives the data on the job list 5C from the other end of the connection. In this way, the job list obtaining portion 164 obtains the job list 5C.

When the job list obtaining portion 164 obtains the job list 5C from the other end of the connection, the seventh session disconnecting portion 165 of the image forming apparatus 1Cj and the eighth session disconnecting portion 174 of the other end of the connection perform processing for disconnecting the session therebetween.

As described above, a plurality of the image forming apparatuses 1 are determined to be other ends of the connections by the other end of connection determination portion 162. Where all the sessions cannot be established around the same time, the seventh session establishing portion 163 and the job list obtaining portion 164 preferably establish the sessions in sequence, and obtain the job lists 5C.

Figure 12B:
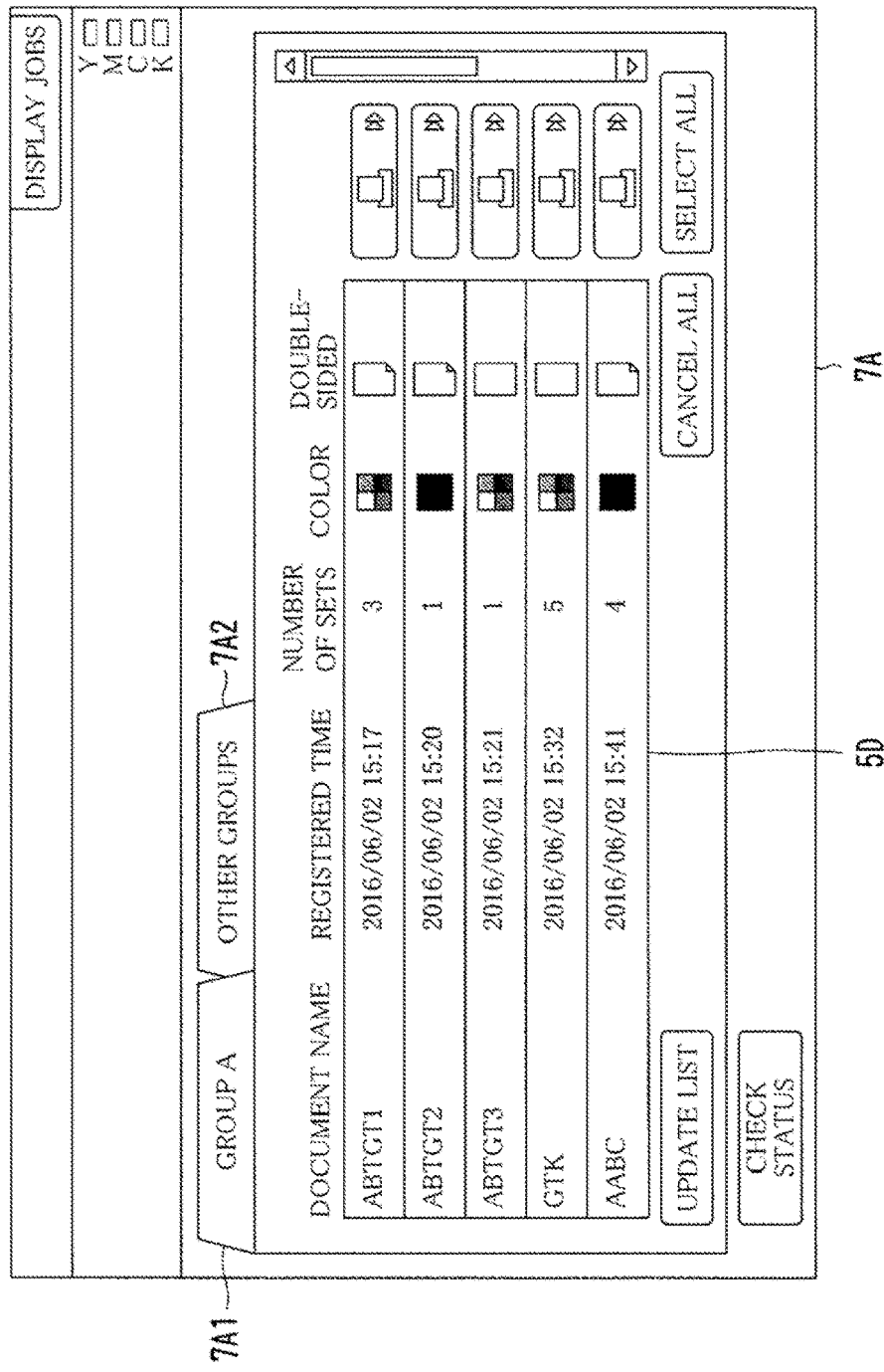

With the image forming apparatus 1Cj, the job list displaying portion 166 displays the job list screen 7A on the touch-sensitive panel display 10e. The job list screen 7A shows a job list 5D in which the job lists 5C obtained from each of the other end of the connections are organized.

Where the user 80 is a normal user, a list of jobs as met shown in FIG. 12A is arranged as the job list 5D. The list includes jobs suspended in the image forming apparatus 1 that is in the same group as that of the image forming apparatus 1Cj, namely, in the group 4C, and works as a storage server. The job list 5D is so arranged that a tab 7A1 of that group 4 (group 4C) is selected.

Where the user 80 is a guest user, a list of jobs as that shown in FIG. 12B is arranged as the job list 5D. The list includes jobs suspended in the image forming apparatuses 1 that are in the groups 4 different from that of the image forming apparatus 1Cj, namely, in the groups 4A, 4B, and 4D-4J, and work as storage servers. The job list 5D is so arranged that a tab 7A2 of the groups 4A, 4B, and 4D-4J is selected.

Where the tab 7A1 is selected, the user 80 touches the tab 7A2 to select the same. In response to the selection, the other end of connection determination portion 162 determines the image forming apparatus 1 that is in the same group 4 as that of the subject image forming apparatus 1Cj and works as a storage server to be a new other end of the connection.

Where the tab is selected, the user 80 touches the tab 7A1 to select the same. In response to the selection, the other end of connection determination portion 162 determines the image forming apparatus 1 that is in a group 4 different from that of the subject image forming apparatus 1Cj and works as a storage server to be a new other end of the connection.

The seventh session establishing portion 163, the job list obtaining portion 164, the seventh session disconnecting portion 165, and the job list displaying portion 166 obtain the job lists 5C from the new other ends of the connections and redisplays the job list screen 7A.

After that, when the user 80 selects a job from the job list 5D, the image forming apparatus 1Cj instructs the image forming apparatus 1 suspending the job to execute the job.

Alternatively, the image forming apparatus 1Cj obtains data on the job from the image forming apparatus 1 suspending the job, and executes the job.

Figure 13:
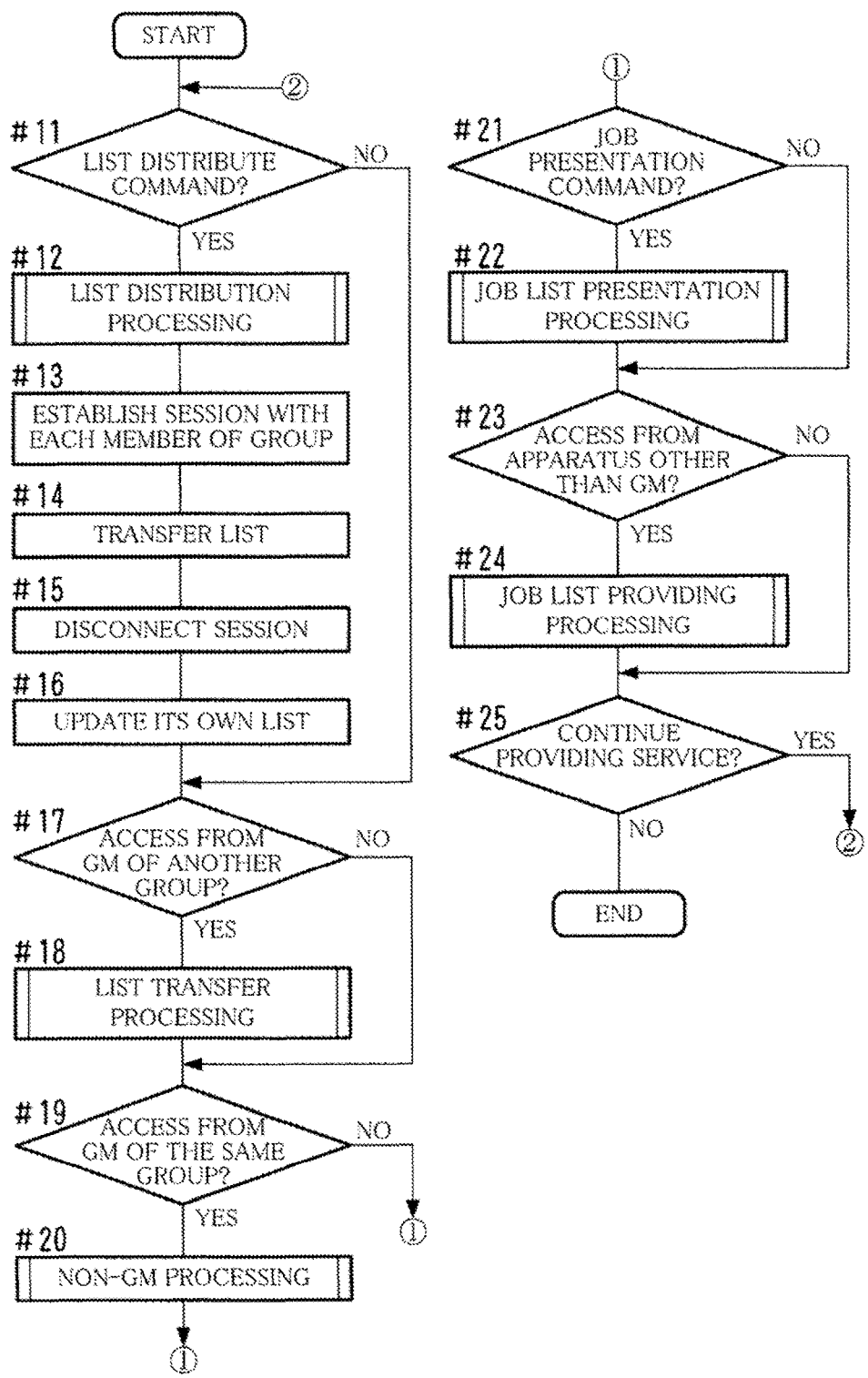
FIG. 13 is a flowchart depicting an example of the flow of the entire processing by an image forming apparatus.
Figure 14:
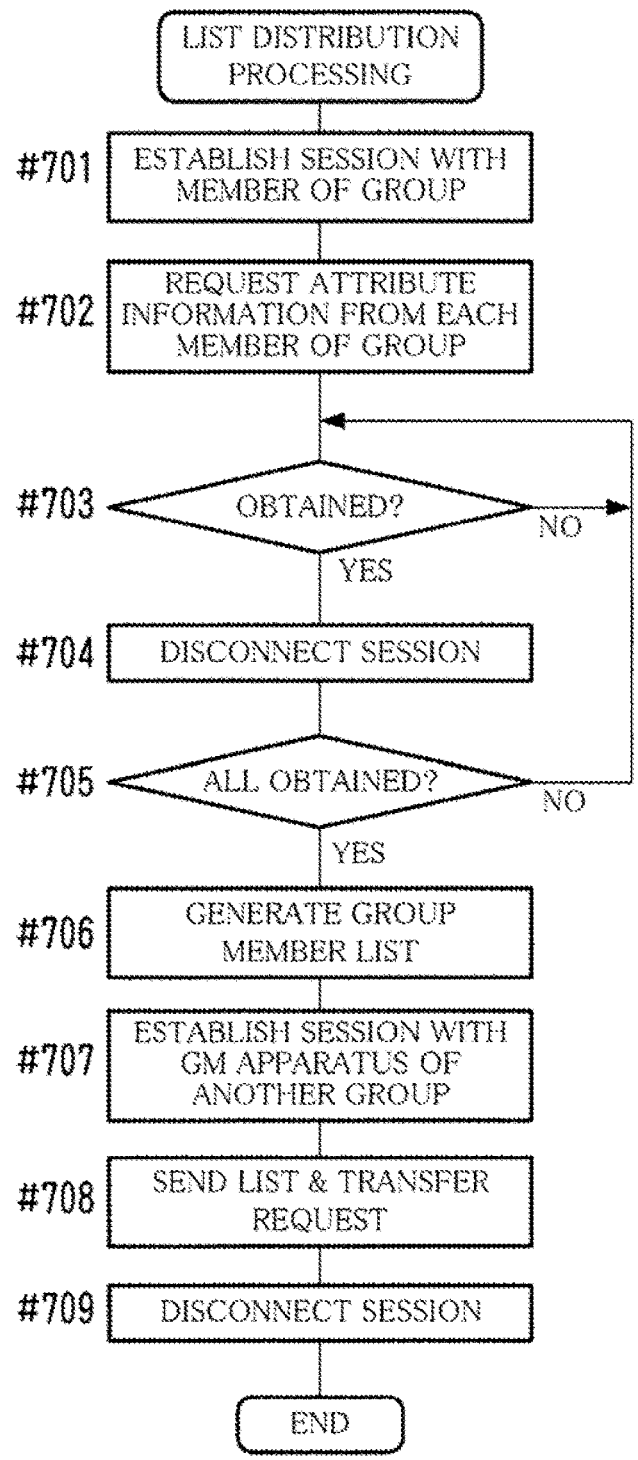
FIG. 14 is a flowchart depicting an example of the flow of list distribution processing.
Figure 15:
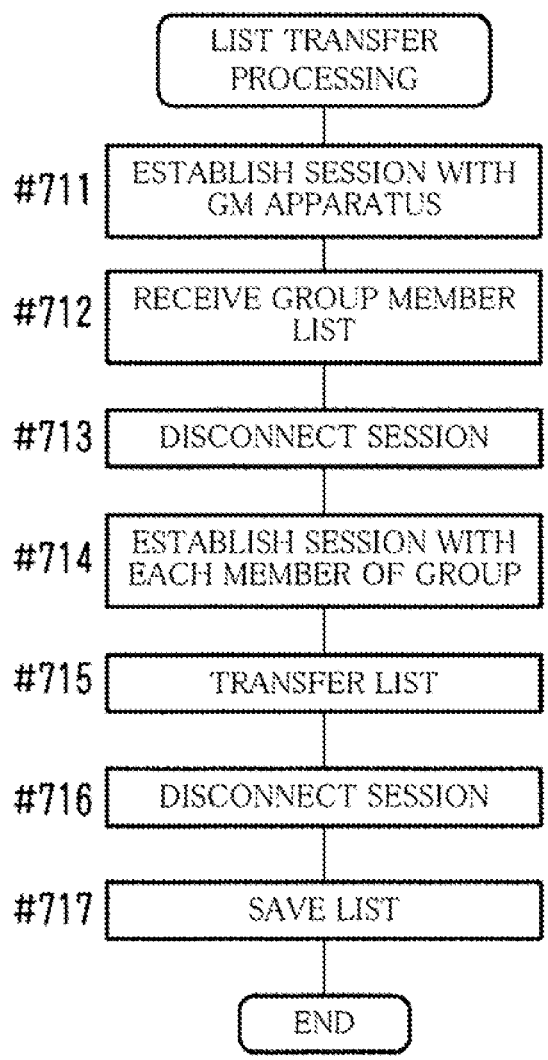
FIG. 15 is a flowchart depicting an example of the flow of list transfer processing.
Figure 16:
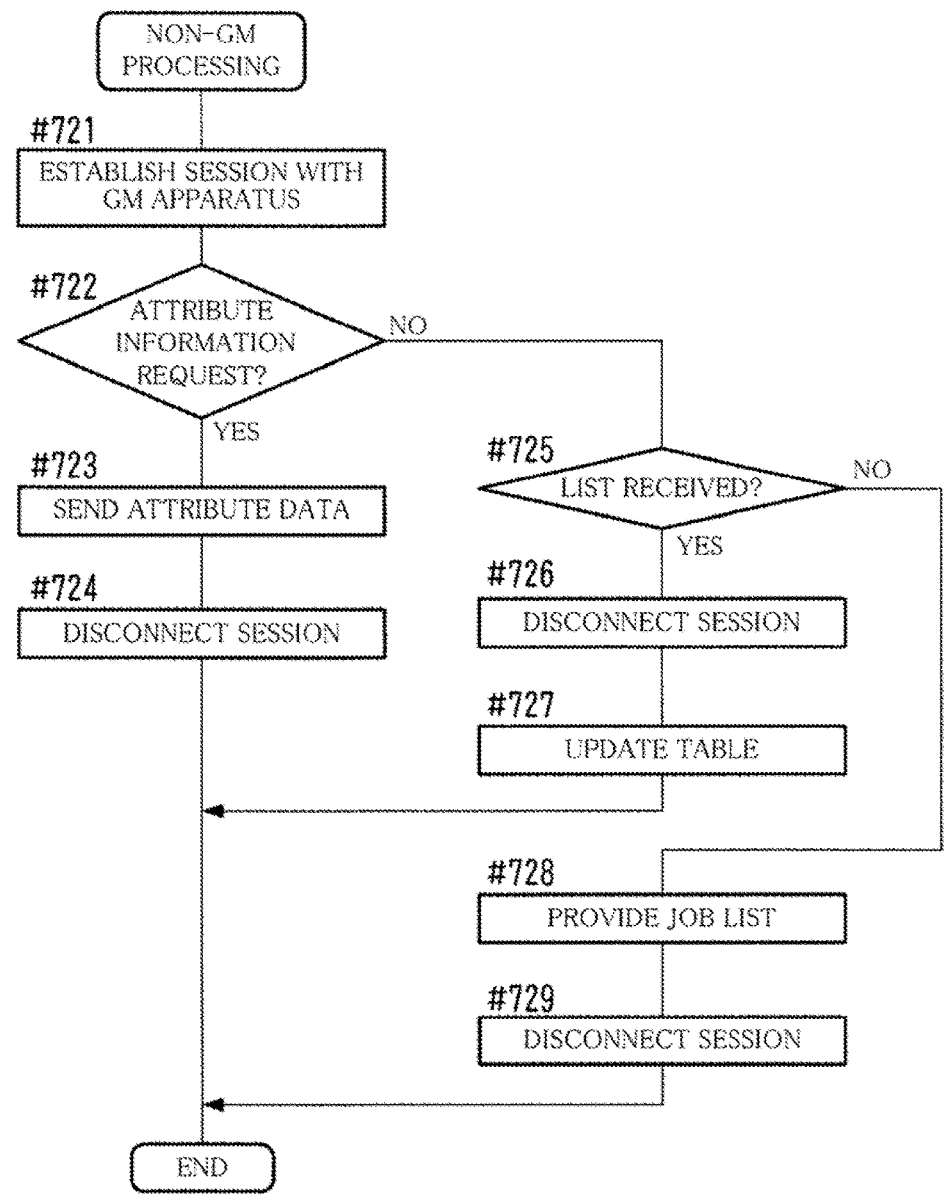
FIG. 16 is a flowchart depicting an example of the flow of non-group manager processing.
Figure 17:
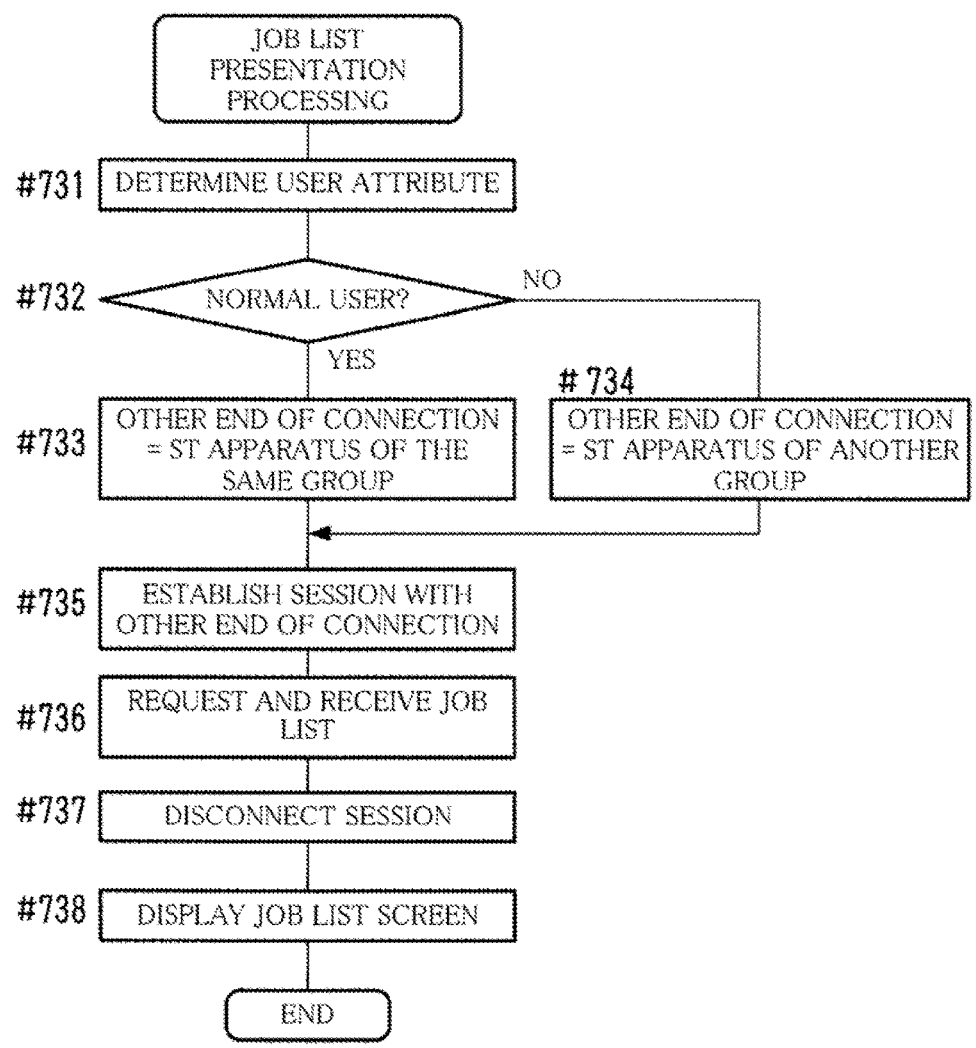
FIG. 17 is a flowchart depicting an example of the flow of job list presentation processing.
Figure 18:
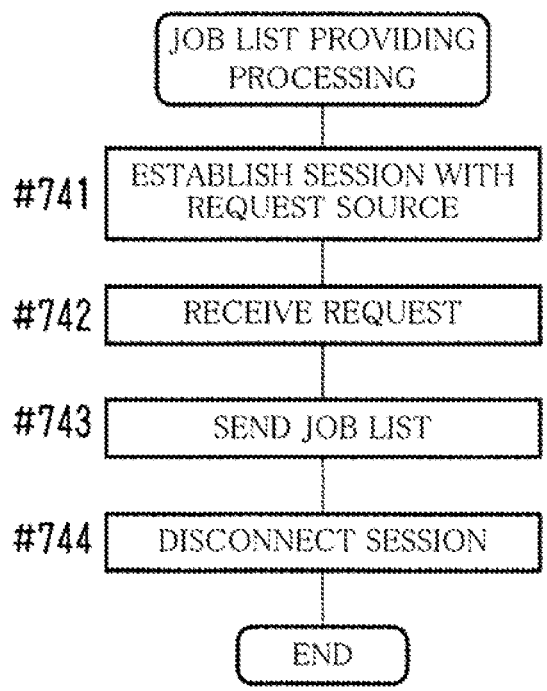
FIG. 18 is a flowchart depicting an example of the flow of job list providing processing.

FIG. 13 is a flowchart depicting an example of the flow of the entire processing by the image forming apparatus 1. FIG. 14 is a flowchart depicting an example of the flow of list distribution processing. FIG. 15 is a flowchart depicting an example of the flow of list transfer processing. FIG. 16 is a flowchart depicting an example of the flow of non-group manager processing. FIG. 17 is a flowchart depicting an example of the flow of job list presentation processing. FIG. 18 is a flowchart depicting an example of the flow of job list providing processing.

The description goes on to the flow of the entire processing based on the member information management program 10P with reference to the flowcharts. The image forming apparatus 1 executes the member information management program 10P in the steps as depicted in FIG. 13.

It a distribute command is entered (YES in Step #11 of FIG. 13), the image forming apparatus 1 performs processing for gathering data on attributes of all of the members of the group 4 of the subject image forming apparatus 1 and distributing the gathered data to the other groups 4 (Step #12). The steps for the processing are depicted in FIG. 14.

The image forming apparatus 1 establishes a session with each of the other image forming apparatuses 1 of the group 4 of the subject image forming apparatus 1 (Step #701 of FIG. 14) to send the attribute request data 6C to each of the other image forming apparatuses 1 (Step #702).

Every time receiving attribute data 6B (YES in Step #703), the image forming apparatus 1 disconnects the session with the transmission source of the attribute data 6B received (Step #704).

After receiving the attribute data 6B from each of the members other than the subject image forming apparatus 1 (YES in Step #705), the image forming apparatus 1 generates the group member list 5B as that shown in FIG. 3 by organizing the contents indicated in the sets of attribute data 6B and the attributes of the subject image forming apparatus 1 (Step #706).

The image forming apparatus 1 establishes a session with the group manager of each of the other groups 4 (Step #707), and sends data on the group member list 5B to each of the group managers (Step #708). The image forming apparatus 1 disconnects the session with the group manager to which the data is completely sent (Step #709).

Referring back to FIG. 15, the image forming apparatus 1 establishes a session with each of the other image forming apparatuses 1 of the group 4 of the subject image forming apparatus 1 (Step #13) to send the data on the group member list 5B to each of the other image forming apparatuses 1 (Step #14). The image forming apparatus 1 disconnects the session every time the data is completely sent (Step #15).

Where, it is impossible to communicate with another image forming apparatus 1 due to a failure of the system, power-off thereof, or the like, the image forming apparatus 1 preferably stores an identifier (IP address, for example) of that another image forming apparatus 1. Then, the image forming apparatus 1 checks periodically whether or not the communication with that another image forming apparatus 1 is possible. When the communication therewith becomes possible, the image forming apparatus 1 sends the data on the group member list 5B to that another image forming apparatus 1.

In parallel with the processing of Steps #13-#15, or before or after the same, the image forming apparatus 1 updates the member table 5A of the subject image forming apparatus 1 in such a manner that the content of the group member list 5B is reflected (Step #16).

Meanwhile, when a group manager of another group 4 starts processing for establishing a session with the subject image forming apparatus 1 (YES in Step #17 of FIG. 13), the subject image forming apparatus 1 executes processing for transferring the group member list 5B and applying the group member list 5B to the subject image forming apparatus 1 (Step #18). The steps for the processing are depicted in FIG. 15.

The image forming apparatus 1 establishes a session with the group manager (Step #711 of FIG. 15).

When receiving data on the group member list 5B from the group manager (Step #712), the image forming apparatus 1 disconnects the session. (Step #713).

The image forming apparatus 1 establishes a session with another image forming apparatus 1 of the group 4 of the subject image forming apparatus 1 (Step #714) and transfers the data thereto (Step #715). Every time the data is completely transferred, the subject image forming apparatus 1 disconnects the session (Step: #716). Together with the transfer, the subject image forming apparatus 1 instructs that another image forming apparatus 1 to transfer the data to all of the members of the group 4 in which that another image forming apparatus 1 is.

Where it is impossible to communicate with another image forming apparatus 1 due to a failure of the system, power-off thereof, or the like, the image forming apparatus 1 preferably stores an identifier (IP address, for example) of that another image forming apparatus 1. Then, the image forming apparatus 1 checks periodically whether or not the communication with that another image forming apparatus 1 is possible. When the communication therewith becomes possible, the image forming apparatus 1 sends the data on the group member list 5B to that another image forming apparatus 1.

In parallel with the processing of Steps #714-#716, or before or after the same, the image forming apparatus 1 updates the member table 5A of the subject image forming apparatus 1 in such a manner that the content of the group member list 5B is reflected (Step #717).

Meanwhile, when a group manager of the group 4 of the subject image forming apparatus 1 starts processing for establishing a session with the subject image forming apparatus 1 (YES in Step #19 of FIG. 13), the subject image forming apparatus 1 performs processing for replying attributes, updating the member table 5A, or the like (Step #20). The steps for the processing are depicted in FIG. 16.

The image forming apparatus 1 establishes a session with the group manager (Step #721 of FIG. 16).

When receiving the attribute request data 6C from the group manager (YES in Step #722), the image forming apparatus 1 sends data indicating attributes thereof as the attribute data 6B to the group manager (Step #723). After the data is completely sent, the image forming apparatus 1 disconnects the session (Step #724).

When receiving data on the group member list 5B from the group manager (NO in Step #722 and YES in Step #725), the image forming apparatus 1 receives the data completely and disconnects the session (Step #726). Then, the image forming apparatus 1 updates the member table 5A thereof in such a manner that the content of the group member list 5B is reflected (Step #727).

Where receiving the job list, request data 6D from the group manager (NO in Step #722 and NO in Step #725), the image forming apparatus 1 sends data on a list of jobs suspended, namely, data on the job list 5C to the transmission source or the job list request data 6D (Step #728). After the data is completely sent, the image forming apparatus 1 disconnects the session (Step #729).

Referring back to FIG. 13, when a job presentation command is entered (YES in Step #21), the image forming apparatus 1 performs processing for presenting a list of jobs suspended in the storage server to the user (Step #22). The steps for the processing are depicted in FIG. 17.

The image forming apparatus 1 determines whether or not the user is a normal user or a guest user (Step #731 of FIG. 17).

When determining that the user is a normal user (YES in Step #732), the image forming apparatus 1 determines another image forming apparatus 1 that is in the same group 4 as that of the subject image forming apparatus 1 and works as a storage server to be the other end of the connection (Step #733). In contrast, when determining that the user is a guest user (NO in Step #732), the image forming apparatus 1 determines another image forming apparatus 1 that is in another group 4 and works as a storage server to be the other end of the connection (Step #734).

The image forming apparatus 1 establishes a session with the other end of the connection determined in Step #733 or Step #734 (Step #735) to send the job list request data 6D. When receiving data on the job list 5C from the other end of the connection (Step #736), the image forming apparatus 1 disconnects the session with the other end of the connection (Step #737). If there are other ends of connections, the image forming apparatus 1 performs the processing of Step #735 through Step #737 for each of the other ends of the connections.

The image forming apparatus 1 then displays the job list screen 7A based on the data received in Step #736 (Step #738).

Every time the tab 7A1 or the tab 7A2 is touched, the image forming apparatus 1 determines a new other end of connection and performs the processing of Step #735 through Step #718.

Referring back to FIG. 13, when another image forming apparatus 1 that is not a group manager starts processing for establishing a session with the subject image forming apparatus 1 (YES in Step #23 of FIG. 13), the subject image forming apparatus 1 performs processing for providing a list of jobs (Step #24). The steps for the processing are depicted in FIG. 18.

The image forming apparatus 1 establishes a session with that another image forming apparatus 1 (Step #741 of FIG. 18).

When receiving the job list request data 6D from that another image forming apparatus 1 (Step #742), the image forming apparatus 1 sends data on the job list 5C to that another image forming apparatus 1 (Step #743). After the data is completely sent, the image forming apparatus 1 disconnects the session (Step #744).

Referring back to FIG. 11, while continuing providing service (Yes in Step #25), the image forming apparatus 1 performs the processing of Step #12 through Step #16, the processing of Step #18, the processing of Step #20, the processing of Step #22, and the processing of Step 124 appropriately.

According to this embodiment, as shown in FIGS. 7, 9, and 10, the sessions are established in the three stages. This shortens the time taken to send information to all of the image forming apparatuses 1 of the image processing system 2.

Hereinafter, modifications to this embodiment are provided. The individual processing in the modifications are performed appropriately based on the member information management program 10P.

In this embodiment, one group 4 has ten image forming apparatuses 1 at maximum. The number "ten (10)" equals the number of sessions that can be kept active concurrently (maximum number of sessions) plus 1. Depending on the maximum number of sessions, the number of image forming apparatuses 1 of one group 4 can be changed.

In this embodiment, at a time when the user enters a distribute command, a group manager of a group 4 gathers data on attributes of all of the members of the group 4. The data gathered is sent to all of the members of the group 4 and is sent to all of the members of the other groups 4 through the group managers of the other groups 4.

Instead of this, the following configuration is also possible. Where the user enters a predetermined command and designates a group 4, a certain image forming apparatus 1 may request data on attributes of all of the members of the group 4 from a group manager of the group 4.

At this time, the group manager performs the processing of Step #701 through Step #706 of FIG. 14 to generate a group member list 5B and send the same to the image forming apparatus 1.

However, it is desirable to postpone making a data request, provided that a load placed on the group manager (the number of sessions kept active, the CPU utilization, the number of ongoing jobs, the size of an ongoing job, and so on) is equal to or higher than a predetermined value. Then, the request is preferably made when the load is reduced at a value lower than the predetermined value. Where the priority of a job is lower than a predetermined value, the group manager sends the group member list 5B promptly. Where the priority of the job is higher than the predetermined value, the group manager may send the group member list 5B after the ongoing job is completed.

The following configuration is also possible. At a time when a group manager detects a change in attributes (device name, IP address, a group, and so on) of any of the members of the group 4 of the group manager, the group manager may gather data on attributes of all of the members of the group 4. The group manager may send the data to all of the members of the group 4, or may send the data through a group manager of another group 4 to all of the members of that another group 4.

The group manager may detect a change in attributes by making an inquiry to each member at regular intervals, for example, every 10 minutes.

Alternatively, the group manager may poll all of the other image forming apparatuses 1 at regular intervals to send data on attributes to the requesting image forming apparatus 1.

Where it is impossible to communicate with a storage server that is the request source of a job list due to a failure of the system, power-off thereof, or the like, the image forming apparatus 1 preferably stores an identifier (IP address, for example) of the storage server. Then, when detecting that the communication with the storage server becomes possible, the image forming apparatus 1 preferably requests the job list request data 6D from the storage server to receive data on the job list 5C from the storage server.

In this embodiment, an example of data to be shared by all of the image forming apparatuses 1 is data on attributes of all of the members of one group 4, namely, the group member list 5B. Instead of this, the data to be shared may be data on attributes of a specific image forming apparatus 1. Alternatively, the data to be shared may be data on another item.

Where a load placed on the image forming apparatus 1 working as a group manager (the number of sessions kept active, the CPU utilization, the number of ongoing jobs, the size of an ongoing job, and so on) is equal to or higher than a predetermined value, another image forming apparatus 1 of the group 4 of the group manager may take over the work as the group manager, or, alternatively, may work in place of the group manager. Alternatively, when the image forming apparatus 1 stops providing service, that another image forming apparatus 1 may take over the work as the group manager. In such cases, the type of the image forming apparatus 1 and the type of that another image forming apparatus 1 are changed. Thus, the post-change attributes of both the apparatuses are preferably conveyed to all of the other image forming apparatuses 1 in the foregoing method. In order to stop the service by the image forming apparatus 1, the processing goes to "NO" in Step #25 of FIG. 13. After that, the image forming apparatus 1 preferably requests that another image forming apparatus to take over the work as the group manager.

It is assumed that the terminal 31 causes the image forming apparatus 1 that works as both a group manager and a storage server to execute PC printing. If the load placed on the image forming apparatus 1 or the communication traffic is equal to or greater than a predetermined value, the PC printing job spooling may be postponed until when the load or the communication traffic becomes smaller than the predetermine value.

In one group 4, if a load placed on the image forming apparatus 1 that works as both the group manager and the storage server is equal to or greater than a predetermined value, another image forming apparatus 1 of that group 4 may take over the work as the group manager. In such a case, the post-change attributes of both the apparatuses 1 may be conveyed to all of the other image forming apparatuses 1 in the foregoing method.

Where a communication with another image forming apparatus 1 fails, the image forming apparatus 1 may ask a group manager of a group 4 of that another image forming apparatus 1 about attributes of that another image forming apparatus 1. Then, the image forming apparatus 1 preferably performs communication with that another image forming apparatus 1 based on the attributes thus obtained.

It is to be understood that the configurations of the image processing system 2 and the image forming apparatus 1, the constituent elements thereof, the content of the processing, the order of the processing, the structure of the data, the structure of the screen, and the like may be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. An image processing system comprising:
   a plurality of image forming apparatuses; wherein
   each of the plurality of image forming apparatuses are classified into a respective one of a plurality of groups,
   a first of the plurality of image forming apparatuses is classified into a first of the groups, the first image forming apparatus being operable to send target data to be shared,
   other image forming apparatuses of the plurality of image forming apparatuses that are not classified in the first group are classified into other groups, other than the first group,
   the first image forming apparatus performs a first transmission processing for sending the target data to a second image forming apparatus in each of the groups other than the first group, the second image forming apparatuses being a part of the plurality of image forming apparatuses,
   each of the second image forming apparatuses transfers the target data to image forming apparatuses of the plurality of image forming apparatuses other than the second image forming apparatuses and other than image forming apparatuses in the first group, and
   the first image forming apparatus performs a second transmission processing for sending the target data to an image forming apparatus classified into the first group other than the first image forming apparatus.

2. The image processing system according to claim 1, wherein
   in each of the plurality of image forming apparatuses, a maximum number of sessions N is preset, the maximum number of sessions N indicating a quantity of sessions that can be kept active concurrently by said each of the image forming apparatuses, and
   a quantity of image forming apparatuses classified, out of the plurality of image forming apparatuses, into each of the groups is (N+1) at maximum.

3. The image processing system according to claim 1, wherein the first image forming apparatus obtains, from each of image forming apparatuses that is not the first image forming apparatus, is a part of the plurality of image forming apparatuses, and is classified into the first group, attribute data related to attributes of said each of image forming apparatuses, and sends, as the target data, the attribute data and data indicating attributes of the first image forming apparatus.

4. The image processing system according to claim 1, wherein the plurality of image forming apparatuses are registered in advance in any one of the groups.

5. The image processing system according to claim 1, wherein the first transmission processing is to send the target data from one of the second image forming apparatuses installed near the first image forming apparatus.

6. The image processing system according to claim 1, wherein the first image forming apparatus performs request processing, before the first image forming apparatus stops service, for making a request for acting for the first image forming apparatus to any of image forming apparatuses that is a part of the plurality of image forming apparatuses and is classified into the first group together with the first image forming apparatus.

7. The image processing system according to claim 1, wherein the first image forming apparatus performs third processing for sending, in response to a request for a job list from the second image forming apparatus or any of image forming apparatuses that is a part of the plurality of image forming apparatuses and is classified into the first group together with the first image forming apparatus, the job list to a request source.

8. An image forming apparatus used in a system having a first group and one or more second groups into which second group a plurality of second image forming apparatuses are classified, and the image forming apparatus is classified into the first group together with a third image forming apparatus, the image forming apparatus comprising:
   a transmitter configured to send target data to be shared to the plurality of second image forming apparatuses, one by one, classified into the second groups, and to send the target data to the third image forming apparatus.

9. A method for sharing target data with a plurality of image forming apparatuses, comprising:
   classifying the plurality of image forming apparatuses into a respective one of a plurality of groups;
   classifying a first of the plurality of image forming apparatuses into a first of the groups, the first image forming apparatus being operable to send target data,
   classifying other image forming apparatuses of the plurality of image forming apparatuses that are not classified in the first group into other groups, other than the first group;

sending, by the first image forming apparatus, the target data to a second image forming apparatus in each of the groups other than the first group, the second image forming apparatuses being a part of the plurality of image forming apparatuses;

transferring, by each of the second image forming apparatuses, the target data to image forming apparatuses of the plurality of image forming apparatuses other than the second image forming apparatuses and other than image forming apparatuses in the first group; and transferring, by the first image forming apparatus, the target data to an image forming apparatus classified into the first group other than the first image forming apparatus.

10. A non-transitory recording medium storing a computer readable program for controlling an image forming apparatus, the image forming apparatus being used in a system having a first group and one or more second groups into which second group a plurality of second image forming apparatuses are classified, and the image forming apparatus is classified into the first group together with a third image forming apparatus, the computer readable program controlling the image forming apparatus to execute processing comprising:

first transmission processing for sending target data to be shared to the plurality of second image forming apparatuses, one by one, classified into the second groups; and second transmission processing for sending the target data to the third image forming apparatus.

11. The non-transitory recording medium according to claim 10, wherein the computer readable program controls the image forming apparatus to perform obtaining processing for obtaining, from each of the third image forming apparatuses, attribute data related to attributes of said each of the third image forming apparatuses, and the target data includes the attribute data and data indicating attributes of the image forming apparatus.

12. The non-transitory recording medium according to claim 10, wherein, when communication with the second image forming apparatus is impossible, the first transmission processing is to send, after the communication with the second image forming apparatus becomes possible, the target data to the second image forming apparatus.

13. The non-transitory recording medium according to claim 10, wherein, when a load placed on the second image forming apparatus is equal to or greater than a predetermined value, the first transmission processing is to send, after the load becomes smaller than the predetermined value, the target data to the second image forming apparatus.

14. The non-transitory recording medium according to claim 10, wherein, when communication with the third image forming apparatus is impossible, the second transmission processing is to send, after the communication with the third image forming apparatus becomes possible, the target data to the third image forming apparatus.

15. The non-transitory recording medium according to claim 10, wherein, when a load placed on the third image forming apparatus is equal to or greater than a predetermined value, the second transmission processing is to send, after the load becomes smaller than the predetermined value, the target data to the third image forming apparatus.

16. The non-transitory recording medium according to claim 10, wherein the first transmission processing is to send the target data preferentially from one of the second image forming apparatuses installed near the image forming apparatus.

17. The non-transitory recording medium according to claim 10, wherein the computer readable program controls the image forming apparatus to perform request processing, before the image forming apparatus stops service, for making a request for acting for the image forming apparatus to any of the third image forming apparatuses.

18. The non-transitory recording medium according to claim 10, wherein the computer readable program controls the image forming apparatus to perform third transmission processing for sending, in response to a request for a job list from the second image forming apparatus or the third image forming apparatus, the job list to the second image forming apparatus or the third image forming apparatus.

* * * * *